(12) United States Patent
Xu

(10) Patent No.: US 10,387,856 B2
(45) Date of Patent: Aug. 20, 2019

(54) ONLINE PAYMENT METHOD, SYSTEM, AND APPARATUS

(71) Applicant: Huawei Technologies Co., Ltd., Shenzhen (CN)

(72) Inventor: Zhixian Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 436 days.

(21) Appl. No.: 15/108,241

(22) PCT Filed: Dec. 25, 2013

(86) PCT No.: PCT/CN2013/090398
§ 371 (c)(1),
(2) Date: Jun. 24, 2016

(87) PCT Pub. No.: WO2015/096053
PCT Pub. Date: Jul. 2, 2015

(65) Prior Publication Data
US 2016/0321628 A1    Nov. 3, 2016

(51) Int. Cl.
*G06Q 30/00* (2012.01)
*G06Q 20/12* (2012.01)
(Continued)

(52) U.S. Cl.
CPC ............ *G06Q 20/12* (2013.01); *G06Q 20/34* (2013.01); *G06Q 20/401* (2013.01); *H04L 67/28* (2013.01); *H04L 67/306* (2013.01); *H04L 67/26* (2013.01)

(58) Field of Classification Search
CPC ...... G06Q 20/12; G06Q 20/34; G06Q 20/401; H04L 67/26; H04L 67/28; H04L 67/306
See application file for complete search history.

(56) References Cited

U.S. PATENT DOCUMENTS 5,778,173 A * 7/1998 Apte .................. G06Q 20/02
705/75
6,058,250 A * 5/2000 Harwood ............ G06Q 20/425
705/26.35
(Continued)

FOREIGN PATENT DOCUMENTS

CN    101154280 A    4/2008
CN    101714272 A    5/2010
(Continued)

OTHER PUBLICATIONS

Philip McCrea "Trends in Electronic Procurement", CSIRO Dec. 1997. (Year: 1997).*

*Primary Examiner* — Naeem U Haq
(74) *Attorney, Agent, or Firm* — Leydig, Voit & Mayer, Ltd.

(57) ABSTRACT

Embodiments of the present invention provide an online payment method, system, and an apparatus, which are applied to the field of information security, and can improve security of user information during online payment, and ensure capital security of a user. The online payment method is applied to a terminal device, and includes: generating a first binding request, where the first binding request includes first user information, an application identifier, and a terminal device identifier; sending the first binding request to a payment proxy server; receiving an associated identifier sent by the payment proxy server; generating a second binding request according to the associated identifier, where the second binding request includes second user information and the associated identifier, and the second user information and the first user information are used for forming complete user information; and sending the second binding request to the payment proxy server.

21 Claims, 12 Drawing Sheets

(51) Int. Cl.
*H04L 29/08* (2006.01)
*G06Q 20/34* (2012.01)
*G06Q 20/40* (2012.01)

(56) References Cited

U.S. PATENT DOCUMENTS

| | | | |
|---|---|---|---|
| 6,477,578 B1 * | 11/2002 | Mhoon | G06Q 20/02 |
| | | | 705/38 |
| 2003/0120608 A1 * | 6/2003 | Pereyra | G06Q 20/12 |
| | | | 705/64 |
| 2005/0240524 A1 * | 10/2005 | Van De Van | G06Q 20/102 |
| | | | 705/40 |
| 2007/0055734 A1 | 3/2007 | Takae et al. | |
| 2010/0017334 A1 | 1/2010 | Itoi et al. | |
| 2011/0145152 A1 | 6/2011 | McCown | |
| 2012/0072346 A1 | 3/2012 | Barkan Daynovsky et al. | |
| 2013/0018797 A1 | 1/2013 | Itoi et al. | |
| 2013/0282535 A1 * | 10/2013 | Bhaowal | G06Q 20/12 |
| | | | 705/30 |
| 2014/0324701 A1 | 10/2014 | Jiang | |

FOREIGN PATENT DOCUMENTS

| | | |
|---|---|---|
| CN | 102663586 A | 9/2012 |
| CN | 102870132 A | 1/2013 |
| CN | 103020819 A | 4/2013 |
| JP | 2002259869 A | 9/2002 |
| JP | 2004030126 A | 1/2004 |
| JP | 2010026621 A | 2/2010 |
| KR | 20110029374 A | 3/2011 |
| KR | 20120129106 A | 11/2012 |
| KR | 20130101778 A | 9/2013 |
| WO | WO 2012073014 A1 | 6/2012 |

\* cited by examiner

US 10,387,856 B2

ONLINE PAYMENT METHOD, SYSTEM, AND APPARATUS

CROSS-REFERENCE TO RELATED APPLICATIONS

This application is a National Stage of International Application No. PCT/CN2013/090398, filed on Dec. 25, 2013, which is hereby incorporated by reference in their entireties.

TECHNICAL FIELD

The present invention relates to the field of information security, and in particular, to an online payment method, system, and an apparatus.

BACKGROUND

With the development of smartphones, mobile phone applications applicable to the smartphones also increasingly grow in quantity, where a large part of the mobile phone applications are paid applications, that is, they can be used only when users pay corresponding fees. However, not all application developers of paid applications qualify for online payment, which requires that an online payment agent provides an online payment proxy service for a paid application not qualifying for online payment by using a payment proxy server. However, when the payment proxy server provides the online payment proxy service, an cooperating paid application needs to be integrated with a payment open SDK (Software Development Kit, software development kit) provided by the online payment agent, and then input of information about a bank card of a user and submittal of a payment request are completed by using the payment open SDK. However, some malicious paid applications may tamper the payment open SDK provided by the online payment agent. User information such as a bank card number and password of a user are intercepted when the user completes input of information about the bank card number and the password and are sent to a third-party server, and then unauthorized online payment is performed online by using the obtained information. Therefore, by using this online payment method, security of the user information is relatively low, and capital security of the user may be impaired.

SUMMARY

Embodiments of the present invention provide an online payment method and apparatus, which can improve security of user information during online payment, and ensure capital security of a user.

To achieve the foregoing objective, the embodiments of the present invention use the following technical solutions:

A first aspect provides an online payment method, applied to a terminal device, including:

generating a first binding request, where the first binding request includes first user information, an application identifier, and a terminal device identifier;

sending the first binding request to a payment proxy server, so that the payment proxy server generates an associated identifier according to the first binding request, where the associated identifier is associated with the first user information, the application identifier, and the terminal device identifier;

receiving the associated identifier sent by the payment proxy server;

generating a second binding request according to the associated identifier, where the second binding request includes second user information and the associated identifier, and the second user information and the first user information are used for forming complete user information; and sending the second binding request to the payment proxy server, so that the payment proxy server acquires the first user information, the application identifier, and the terminal device identifier according to the first binding request, acquires the second user information according to the second binding request, then acquires the complete user information according to the first user information and the second user information, and establishes a payment binding relationship according to the complete user information, the application identifier, and the terminal device identifier, where the payment binding relationship is used for indicating a binding relationship among the complete user information, the application identifier, and the terminal device identifier.

With reference to the first aspect, in a first implementable manner, the generating a second binding request according to the associated identifier includes:

sending a user information request to the payment proxy server according to the associated identifier, so that the payment proxy server sends preset location information of the first user information to the terminal device according to the user information request;

receiving the preset location information that is of the first user information and is sent by the payment proxy server;

generating the second user information according to the preset location information of the first user information, where the second user information and the first user information are used for forming the complete user information; and generating the second binding request, where the second binding request includes the second user information and the associated identifier.

With reference to the first aspect or the first implementable manner, in a second implementable manner, after the sending the second binding request to the payment proxy server, the method further includes:

receiving card binding information sent by the payment proxy server, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information; and saving the card binding information.

With reference to the second implementable manner, in a third implementable manner, after the saving the card binding information, the method further includes:

receiving a commodity payment request of the user by using a first application, where the first application is an application in the terminal device;

determining whether the card binding information stored in the terminal device includes first card binding information according to the terminal device identifier and an application identifier of the first application, where the first card binding information includes the terminal device identifier and the application identifier of the first application;

generating a first payment request when the information stored in the terminal device includes the first card binding information; and sending the first payment request to the payment proxy server, so that the payment proxy server determines according to the first payment request whether to pay network fees.

With reference to the third implementable manner, in a fourth implementable manner, the generating a first payment request includes:

acquiring the first card binding information;

acquiring the third user information included in the first card binding information according to the first card binding information;

prompting the user to input the payment verification information according to a preset rule and according to the third user information included in the first card binding information;

receiving the payment verification information that is input by the user; and generating the first payment request, where the first payment request includes the first card binding information and the payment verification information that is input by the user.

A second aspect provides an online payment method, used for a payment proxy server, including:

receiving a first binding request sent by a terminal device, where the first binding request includes first user information, an application identifier, and a terminal device identifier;

generating an associated identifier according to the first binding request, where the associated identifier is associated with the first user information, the application identifier, and the terminal device identifier;

sending the associated identifier to the terminal device, so that the terminal device generates a second binding request according to the associated identifier, where the second binding request includes second user information and the associated identifier, and the second user information and the first user information are used for forming complete user information;

receiving the second binding request sent by the terminal device;

acquiring the complete user information, the application identifier, and the terminal device identifier according to the first binding request and the second binding request; and establishing a payment binding relationship according to the complete user information, the application identifier, and the terminal device identifier, where the payment binding relationship is used for indicating a binding relationship among the complete user information, the application identifier, and the terminal device identifier.

With reference to the second aspect, in a first implementable manner, the acquiring the complete user information, the application identifier, and the terminal device identifier according to the first binding request and the second binding request includes:

acquiring the second user information and the associated identifier from the second binding request;

acquiring the first user information, the application identifier, and the terminal device identifier according to the associated identifier; and combining the first user information and the second user information to form the complete user information.

With reference to the second aspect or the first implementable manner, in a second implementable manner, after the establishing a payment binding relationship according to the complete user information, the application identifier, and the terminal device identifier, the method further includes:

generating card binding information according to the payment binding relationship, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information; and sending the card binding information to the terminal device, so that the terminal device saves the card binding information.

With reference to the second implementable manner, in a third implementable manner, after the sending the card binding information to the terminal device, the method further includes:

receiving a first payment request sent by the terminal device, where the first payment request includes first card binding information and payment verification information that is input by the user, the first card binding information includes the terminal device identifier, an application identifier of a first application, and the third user information, the first application is an application in the terminal device, and the terminal device receives a commodity payment request of the user by using the first application;

acquiring the terminal device identifier and the application identifier of the first application according to the first card binding information;

acquiring, according to the terminal device identifier and the application identifier of the first application, complete user information bound to the terminal device identifier and the application identifier of the first application;

generating local payment verification information according to a preset rule and according to the third user information included in the first card binding information and the complete user information bound to the terminal device identifier and the application identifier of the first application;

determining whether the payment verification information that is input by the user is the same as the local payment verification information; and sending a second payment request to a payment system when the payment verification information that is input by the user is the same as the local payment verification information, so that the payment system pays network fees.

A third aspect provides a terminal device, including:

a binding request generating unit, configured to generate information about a first binding request, where the first binding request includes first user information, an application identifier, and a terminal device identifier;

a sending unit, configured to send the first binding request generated by the binding request generating unit to a payment proxy server, so that the payment proxy server generates an associated identifier according to the first binding request, where the associated identifier is associated with the first user information, the application identifier, and the terminal device identifier; and a receiving unit, configured to receive the associated identifier sent by the payment proxy server, where the binding request generating unit is further configured to generate a second binding request according to the associated identifier received by the receiving unit, where the second binding request includes second user information and the associated identifier, and the second user information and the first user information are used for forming complete user information; and the sending unit is further configured to send the second binding request generated by the binding request generating unit to the payment proxy server, so that the payment proxy server acquires the first user information, the application identifier, and the terminal device identifier according to the first binding request, acquires the second user information according to the second binding request, then acquires the complete user information according to the first user information and the second user information, and establishes a payment binding relationship according to the complete user information, the application identifier, and the terminal device identifier, where the payment binding relationship is used for indicating a binding relationship among the complete user information, the application identifier, and the terminal device identifier.

With reference to the third aspect, in a first implementable manner, the binding request generating unit is specifically configured to:

send a user information request to the payment proxy server according to the associated identifier, so that the payment proxy server sends preset location information of the first user information to the terminal device according to the user information request;

receive the preset location information that is of the first user information and is sent by the payment proxy server;

generate the second user information according to the preset location information of the first user information, where the second user information and the first user information are used for forming the complete user information; and generate the second binding request, where the second binding request includes the second user information and the associated identifier.

With reference to the third aspect or the first implementable manner, in a second implementable manner, the receiving unit is further configured to:

receive card binding information sent by the payment proxy server, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information; and the terminal device further includes a storage unit, configured to save the card binding information.

With reference to the second implementable manner, in a third implementable manner, the terminal device further includes a payment request receiving unit, configured to receive a commodity payment request of the user by using a first application, where the first application is an application in the terminal device;

a determining unit, configured to determine whether the card binding information stored in the terminal device includes first card binding information according to the terminal device identifier and an application identifier of the first application, where the first card binding information includes the terminal device identifier and the application identifier of the first application; and a payment request generating unit, configured to generate a first payment request when the information stored in the terminal device includes the first card binding information, where the sending unit is further configured to send the first payment request to the payment proxy server, so that the payment proxy server determines according to the first payment request whether to pay network fees.

With reference to the third implementable manner, in a fourth implementable manner, the payment request generating unit is specifically configured to:

acquire the first card binding information;

acquire the third user information included in the first card binding information according to the first card binding information;

prompt the user to input the payment verification information according to a preset rule and according to the third user information included in the first card binding information;

receive the payment verification information that is input by the user; and generate the first payment request, where the first payment request includes the first card binding information and the payment verification information that is input by the user.

A fourth aspect provides a payment proxy server, including:

a receiving unit, configured to receive a first binding request sent by a terminal device, where the first binding request includes first user information, an application identifier, and a terminal device identifier;

an associated identifier generating unit, configured to generate an associated identifier according to the first binding request received by the receiving unit, where the associated identifier is associated with the first user information, the application identifier, and the terminal device identifier;

a sending unit, configured to send the associated identifier generated by the associated identifier generating unit to the terminal device, so that the terminal device generates a second binding request according to the associated identifier, where the second binding request includes second user information and the associated identifier, and the second user information and the first user information are used for forming complete user information, where the receiving unit is further configured to receive the second binding request sent by the terminal device;

an acquiring unit, configured to acquire the complete user information, the application identifier, and the terminal device identifier according to the first binding request and the second binding request that are received by the receiving unit; and a binding relationship establishing unit, establishing a payment binding relationship according to the complete user information, the application identifier, and the terminal device identifier, where the payment binding relationship is used for indicating a binding relationship among the complete user information, the application identifier, and the terminal device identifier.

With reference to the fourth aspect, in a first implementable manner, the acquiring unit is specifically configured to:

acquire the second user information and the associated identifier from the second binding request;

acquire the first user information, the application identifier, and the terminal device identifier according to the associated identifier; and combine the first user information and the second user information to form the complete user information.

With reference to the fourth aspect or the first implementable manner, in a second implementable manner, the payment proxy server further includes:

a card binding information generating unit, configured to generate card binding information according to the payment binding relationship, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information, where the sending unit is further configured to send the card binding information to the terminal device, so that the terminal device saves the card binding information.

With reference to the second implementable manner, in a third implementable manner, the receiving unit is further configured to receive a first payment request sent by the terminal device, where the first payment request includes first card binding information and payment verification information that is input by the user, the first card binding information includes the terminal device identifier, an application identifier of a first application, and the third user information, the first application is an application in the terminal device, and the terminal device receives a commodity payment request of the user by using the first application;

the acquiring unit is further configured to:

acquire the terminal device identifier and the application identifier of the first application according to the first card binding information; and acquire, according to the terminal device identifier and the application identifier of the first application, the complete user information bound to the terminal device identifier and the application identifier of the first application;

the payment proxy server further includes a payment verification generating unit, configured to generate local payment verification information according to a preset rule and according to the third user information included in the first card binding information and the complete user information bound to the terminal device identifier and the application identifier of the first application; and a determining unit, configured to determine whether the payment verification information that is input by the user is the same as the local payment verification information, where the sending unit is further configured to send a second payment request to a payment system when the payment verification information that is input by the user is the same as the local payment verification information, so that the payment system pays network fees.

A fifth aspect provides an online payment system, including a terminal device and a payment proxy server, where the terminal device is configured to send a first binding request to the payment proxy server; and send a second binding request to the payment proxy server according to an associated identifier sent by the payment proxy server, so that the payment proxy server acquires complete user information, the application identifier, and the terminal device identifier according to the first binding request and the second binding request, and establishes a payment binding relationship according to the complete user information, the application identifier, and the terminal device identifier; and the terminal device is further configured to receive a commodity payment request of a user by using a first application, and send a first payment request to the payment proxy server when card binding information stored in the terminal device includes first card binding information, so that the payment proxy server determines according to the first payment request whether to pay network fees, where the first card binding information includes the terminal device identifier and an application identifier of the first application; and the payment proxy server is configured to receive the first binding request of the terminal device, generate the associated identifier according to the first binding request, and send the associated identifier to the terminal device, so that the terminal device generates the second binding request according to the associated identifier; and receive the second binding request generated by the terminal device, acquire the complete user information, the application identifier, and the terminal device identifier according to the first binding request and the second binding request, and establish the payment binding relationship according to the complete user information, the application identifier, and the terminal device identifier; and the payment proxy server is further configured to receive the first payment request of the terminal device, generate local payment verification information according to the first payment request, and send a second payment request to a payment system when payment verification information that is input by the user and included in the first payment request is the same as the local payment verification information, so that the payment system pays network fees.

A sixth aspect provides a terminal device, including: a processor, a memory, and a communications bus, where the memory stores a computer execution instruction, and the processor is connected to the memory by using the communications bus; and when the terminal device runs, the processor executes the computer execution instruction stored in the memory, so that the terminal device executes the method according to the first aspect.

A seventh aspect provides a payment proxy server, including: a processor, a memory, and a communications bus, where the memory stores a computer execution instruction, and the processor is connected to the memory by using the communications bus; and when the terminal device runs, the processor executes the computer execution instruction stored in the memory, so that the payment proxy server executes the method according to the second aspect.

In the online payment method, apparatus and system provided in the embodiments of the present invention, before online payment is performed, a payment binding relationship is first established; when the payment binding relationship is established, a terminal device divides user information used for the online payment into first user information and second user information and separately sends the first user information and the second user information; and a payment proxy server receives the first user information and the second user information by using a first binding request and a second binding request, so that a third party cannot obtain complete user information; moreover, after the complete user information is obtained, the payment binding relationship is established, and a user can complete the payment according to the payment binding relationship as long as the user inputs payment verification information, without needing to input the complete user information again, which, compared with the prior art, improves security of user information during the online payment, and can ensure capital security of the user.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
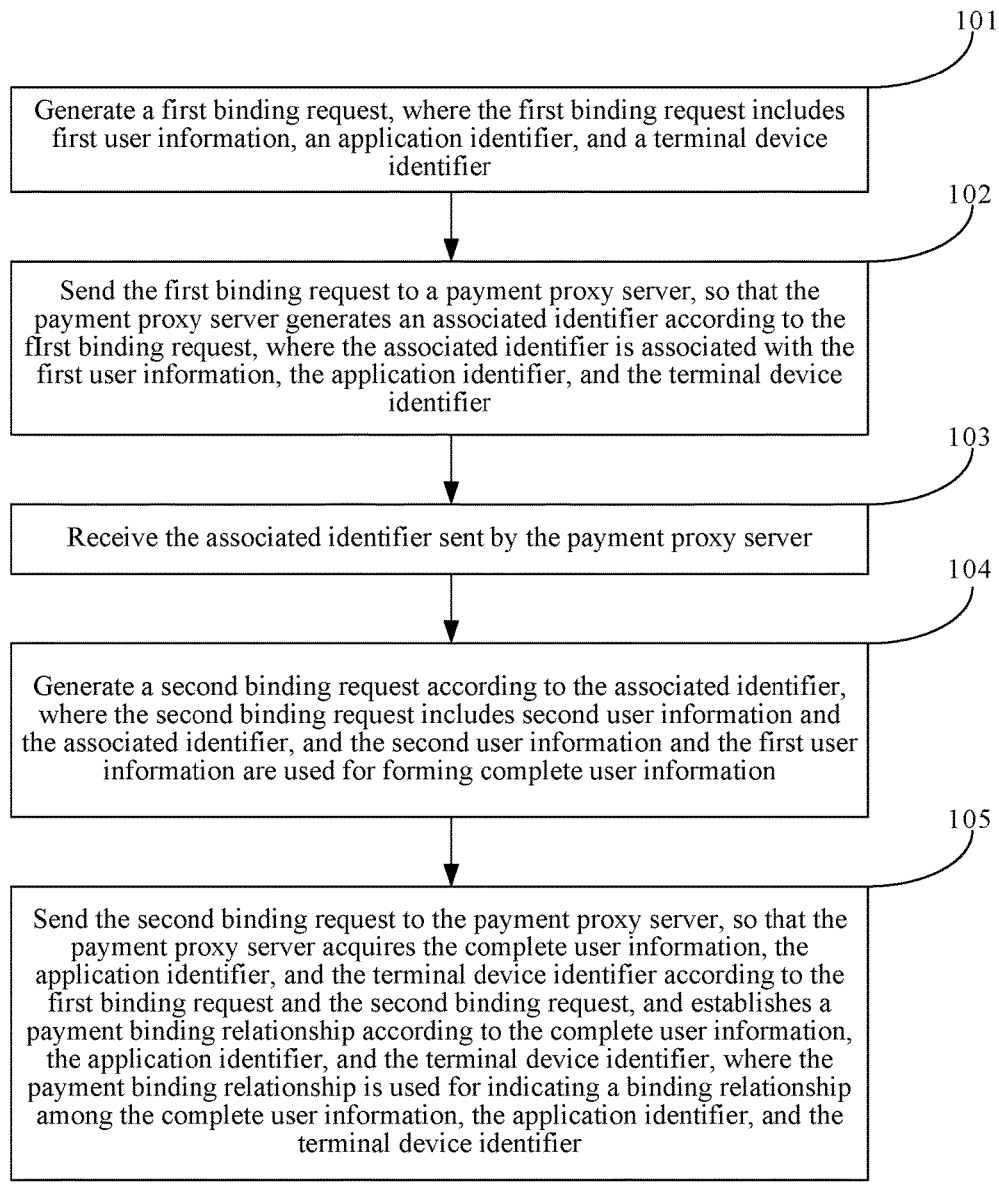
FIG. 1 is a flowchart of an online payment method according to an embodiment of the present invention.

An embodiment of the present invention provides an online payment method, applied to a terminal device, as shown in FIG. 1, including:

Step 101: Generate a first binding request, where the first binding request includes first user information, an application identifier, and a terminal device identifier.

Exemplarily, assuming that a user needs to purchase commodity on an application of a terminal device, after receiving a payment request of the user, the terminal device may first receive first user information input by the user, where the first user information may be partial user information that is of the user and is used for online payment, and may be generally an incomplete bank card number, that is, when inputting the first user information, the user may input a part of the bank card number, and the part of the bank card number may be first several digits of the bank card number, or may be last several digits, or may be several random digits of the bank card number, or may be self-defined according to a user habit, which is not limited in this embodiment of the present invention. The terminal device generates a first binding request according to the first user information input by the user, an application identifier of the application, and a terminal device identifier of the terminal device, where the first binding request includes the first user information, the application identifier, and the terminal device identifier.

Step 102: Send the first binding request to a payment proxy server, so that the payment proxy server generates an associated identifier according to the first binding request, where the associated identifier is associated with the first user information, the application identifier, and the terminal device identifier.

In this embodiment of the present invention, if the application currently used by the user does not qualify for online payment, and requires that the payment proxy server provides a proxy service, the payment proxy server installs a payment SDK in the application, and completes reception of user information and submittal of a payment request by using the payment SDK, and the terminal device may send the first binding request to the payment proxy server by using the payment SDK installed in the application.

Step 103: Receive the associated identifier sent by the payment proxy server.

After the terminal device sends the first binding request to the payment proxy server, the payment proxy server generates an associated identifier according to content in the first binding request, where the associated identifier is associated with the first user information, the application identifier, and the terminal device identifier, and sends the associated identifier to the terminal device. The terminal device may receive, by using the payment SDK, the associated identifier sent by the payment proxy server, or may receive the associated identifier with the help of a message push system. Specifically, a message push client is installed in the terminal device, the payment proxy server first sends the associated identifier to a message push server, then the message push server sends the associated identifier to the message push client of the terminal device, and then the terminal device acquires the associated identifier by using the message push client. In actual application, the terminal device generally chooses to acquire the associated identifier by using the message push server.

Step 104: Generate a second binding request according to the associated identifier, where the second binding request includes second user information and the associated identifier, and the second user information and the first user information are used for forming complete user information.

In this embodiment of the present invention, the terminal device sends a user information request to the payment proxy server according to the associated identifier, where the user information request includes the associated identifier, and after receiving the user information request, the payment proxy server acquires the first user information according to the associated identifier, and then generates preset location information of the first user information according to a preset rule, where the preset location information of the first user information may be where information about several digits that are of the first user information and are set according to the preset rule, remaining information may be replaced with "*", and the preset rule may be set according to a case. The payment proxy server sends the preset location information of the first user information to the terminal device, after receiving the preset location information of the first user information, the terminal device prompts, according to the preset location information of the first user information, the user to input remaining user information used for performing online payment other than the first user information, and the terminal device generates the second user information according to the remaining user information input by the user, where the second user information and the first user information are used for forming the complete user information. In this way, when the terminal device generates the second user information, it is the preset location information of the first user information rather than complete first user information that is used for prompting the user to input the second user information, and therefore when the terminal device generates the second user information, the application currently used by the user cannot acquire complete user information used for performing online payment, so as to ensure security of the user information that is of the user and is used for online payment. After generating the second user information, the terminal device generates a second binding request, where the second binding request includes the second user information and the associated identifier. For example, the first user information is first five digits of a bank card number, and assuming that the preset location information of the first user information acquired by the terminal device according to the associated identifier is the first digit, the third digit, and the fifth digit of the bank card number, and information about rest digits of the first user information may be replaced with a mark "*", the user determines according to the preset location information of the first user information which bank card number is specifically used for performing online payment, and determines according to the preset location information of the first user information that remaining user information that needs to be input is remaining information of the bank card number except the first five digits, and therefore the second user information is last fourteen digits of the bank card number except the first five digits. It should be noted that, when the user is prompted to input the second user information, the user may be further prompted to input an express password, and after acquiring the express password, the payment proxy server may associate the express password with the complete user information formed by the first user information and the second user information, and therefore the second binding request may further include the express password.

Step 105: Send the second binding request to the payment proxy server, so that the payment proxy server acquires the complete user information, the application identifier, and the terminal device identifier according to the first binding request and the second binding request, and establishes a payment binding relationship according to the complete user information, the application identifier, and the terminal device identifier, where the payment binding relationship is used for indicating a binding relationship among the complete user information, the application identifier, and the terminal device identifier.

The terminal device may send the second binding request to the payment proxy server by using the payment SDK, where the second binding request includes the second user information and the associated identifier, and may further include the express password. It should be noted that, in actual application, a process of establishing the payment binding relationship may be performed at the same time as that of an initial payment process, that is, initial payment can be completed and the payment binding relationship can be established by inputting user information twice.

In this way, the user information used for online payment is divided into the first user information and the second user information, and the first user information and the second user information are sent by using the first binding request and the second binding request respectively, so that a third party application cannot obtain the complete user information, which, compared with the prior art, improves security of the user information during the online payment, and can ensure capital security of the user.

Further, after the payment proxy server completes payment binding, a piece of card binding information may be generated, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information. In actual application, the third user information included in the card binding information may also be the first user information or the second user information. For example, assuming that the user information is a bank card, and a complete bank card number is nineteen digits, the third user information included in the card binding information may be five random digits; when online payment is performed, the terminal device prompts the user according to the third user information that the payment verification information needing to be input is remaining fourteen digits of the bank card number; in actual application, the third user information may also be the same as the first user information or the second user information, for example, when the third user information is the same as the first user information, the terminal device prompts the user that the payment verification information needing to be input is the second user information. The payment proxy server sends the card binding information to the terminal device, so that the terminal device saves the card binding information, the payment proxy server may send the card binding information to the terminal device by using the payment SDK, and the terminal device receives the card binding information sent by the payment proxy server, and saves the card binding information.

After the sending the second binding request to the payment proxy server, the payment proxy server establishes the payment binding relationship. If the user confirms next time that online payment needs to be performed in a first application of the terminal device, where the first application is an application in the terminal device, the terminal device first receives a commodity payment request of the user by using the first application, and then the terminal device determines whether the card binding information stored in the terminal device includes first card binding information, where the first card binding information includes the terminal device identifier and an application identifier of the first application, and if the card binding information stored in the terminal device includes the first card binding information, it is determined that the first application of the terminal device has already established the payment binding relationship. Particularly, when the card binding information stored in the terminal device does not include the first card binding information, the terminal device may further send a query request to the payment proxy server, and determine whether another application of the terminal device has already established the payment binding relationship, and after receiving the query request, the payment proxy server queries, according to a terminal device identifier in the query request, whether the another application of the terminal device has already established the payment binding relationship; if the another application of the terminal device has already established the payment binding relationship, the payment proxy server sends query feedback information to the terminal device, where the query feedback information includes the terminal device identifier of the terminal device, and an application identifier of the another application of the terminal device, and further includes partial user information that is of the another application of the terminal device and is used for establishing the payment binding relationship, and then the payment proxy server sends the query feedback information to the terminal device. After receiving the query feedback information sent by the payment proxy server, the terminal device determines whether the query feedback information includes the terminal device identifier, the application identifier, and the partial user information, and when the query feedback information includes the terminal device identifier, the application identifier, and the partial user information, and the terminal device identifier in the query feedback information is the same as a local terminal device identifier, it may be determined that the another application of the terminal device has already established the payment binding relationship.

When the first application or the another application of the terminal device has already established the payment binding relationship, a first payment request is generated. In this embodiment of the present invention, when the first payment request is generated, first card binding information may be first acquired or the query feedback information sent by the payment proxy server may be first received, and if the terminal device obtains the first card binding information, the third user information included in the first card binding information is acquired, and then the user is prompted according to the preset rule to input the payment verification information. For example, when the third user information is five digits of a complete bank card number, the terminal device should prompt the user that the payment verification information needing to be input is rest fourteen digits of the bank card number, the terminal device receives the payment verification information that is input by the user, and then generates the first payment request, where the first payment request includes the first card binding information and the payment verification information that is input by the user. If the terminal device obtains the query feedback information, where the query feedback information includes partial user information, the terminal device may prompt, according to the partial user information, the user to input the payment verification information, and finally generate the first payment request. In this case, the first payment request generated by the terminal device includes the terminal device identifier, an application identifier of the another application, and the payment verification information, and after receiving the first payment request, the payment proxy server may further establish the payment binding relationship among the terminal device identifier, the application identifier of the another application, and the complete user information according to a need. It should be noted that, if the user inputs the express password while sending the second binding request to the payment proxy server, the terminal device may prompt, according to the third user information, the user to input an express payment password, and therefore the payment verification information may also be the express password.

In the online payment method provided in this embodiment of the present invention, before online payment is performed, a payment binding relationship is first established among complete user information, a terminal device identifier and an application identifier, and when the payment binding relationship is established, user information used for online payment is divided into first user information and second user information, and the first user information and the second user information are sent by using a first binding request and a second binding request respectively, so that a third party cannot obtain complete user information; moreover, after the payment binding relationship is established, a user can complete the payment according to the payment binding relationship as long as the user inputs payment verification information, without needing to input the complete user information again, which, compared with the prior art, improves security of user information during the online payment, and can ensure capital security of the user.

Figure 2:
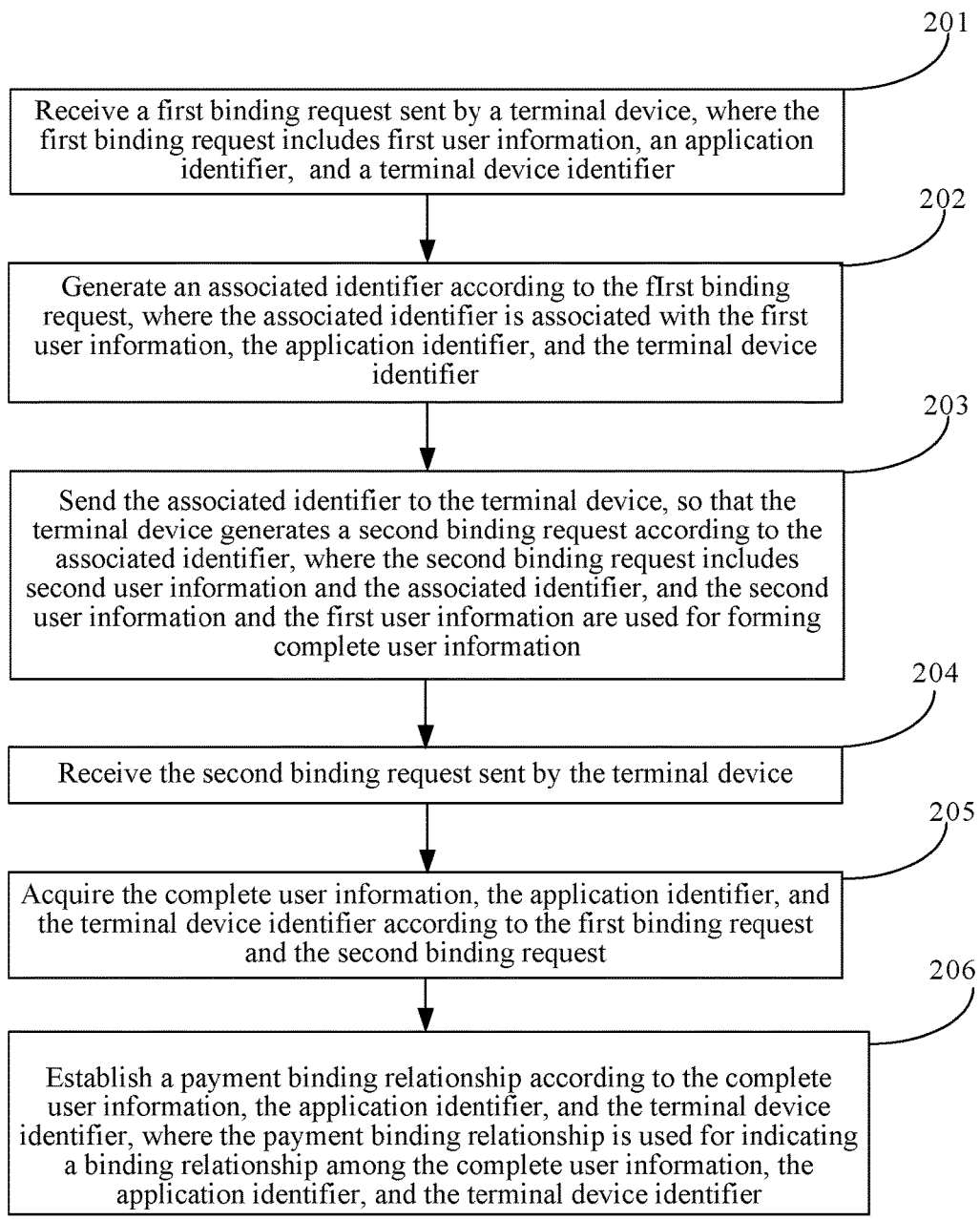
FIG. 2 is a flowchart of another online payment method according to an embodiment of the present invention.

An embodiment of the present invention provides an online payment method, used for a payment proxy server, as shown in FIG. 2, including:

Step 201: Receive a first binding request sent by a terminal device, where the first binding request includes first user information, an application identifier, and a terminal device identifier.

Before receiving the first binding request, the payment proxy server needs to install a payment SDK for an application to which a payment proxy service is provided, so that the terminal device may complete reception of user information and submittal of a payment request by using the payment SDK, and the payment proxy server may receive the first binding request and the first user information included in the first binding request by using the payment SDK, where the first user information is partial information of user information that is input by a user and is used for online payment, and may be generally an incomplete bank card number, that is, when inputting the first user information, the user may input a part of the bank card number, and the part of the bank card number may be first several digits of the bank card number, or may be last several digits, or may be several random digits, or may be self-defined according to a user habit, which is not limited in this embodiment of the present invention. The application identifier included in the first binding request refers to is an application identifier of an application currently used by the user in the terminal device.

Step 202: Generate an associated identifier according to the first binding request, where the associated identifier is associated with the first user information, the application identifier, and the terminal device identifier.

After receiving the first binding request sent by the terminal device, the payment proxy server generates the associated identifier, where the associated identifier is associated with the terminal device identifier, the application identifier, and the first user information that are included in the first binding request. In actual application, a process of establishing a payment binding relationship may be performed at the same time as that of initial payment, and therefore the associated identifier may further include payment information used for instructing the user to confirm payment, for example, information such as purchased commodity, an amount of money needing to be paid, and a payment link, so that the user definitely understands specific content of payment confirmed by the user.

Step 203: Send the associated identifier to the terminal device, so that the terminal device generates a second binding request according to the associated identifier, where the second binding request includes second user information and the associated identifier, and the second user information and the first user information are used for forming complete user information.

Specifically, the payment proxy server may directly send the associated identifier to the terminal device by using the payment SDK, or may first send the associated identifier to a message push server, then the message push server sends the associated identifier to a message push client installed in the terminal device, and then the terminal device acquires the associated identifier by using the message push client. In actual application, the payment proxy server generally sends the associated identifier by using a message push system. After sending the associated identifier to the terminal device, the payment proxy server may further receive a user information request sent by the terminal device, where the user information request includes the associated identifier, acquire the first user information according to the associated identifier, and then generate preset location information of the first user information according to a preset rule, where the preset location information of the first user information may be where information about several digits that are of the first user information and are set according to the preset rule, remaining information may be replaced with "*", and the preset rule may be set according to a case. The payment proxy server sends the preset location information of the first user information to the terminal device, so that the terminal device prompts, according to the preset location information of the first user information, the user to input remaining user information used for performing online payment other than the first user information.

Step 204: Receive the second binding request sent by the terminal device.

Specifically, the terminal device may send the second binding request to the payment proxy server by using the payment SDK, where the second binding request includes the second user information and the associated identifier, and it should be noted that, the second binding request may further include an express password set by the user.

Step 205: Acquire the complete user information, the application identifier, and the terminal device identifier according to the first binding request and the second binding request.

After receiving the second binding request, the payment proxy server first acquires the second user information and the associated identifier that are in the second binding request, acquires, according to the associated identifier, the first user information, application identifier, and the terminal device identifier that are previously stored, and combines the first user information and the second user information in the second binding request to form the complete user information.

Step 206: Establish a payment binding relationship according to the complete user information, the application identifier, and the terminal device identifier, where the payment binding relationship is used for indicating a binding relationship among the complete user information, the application identifier, and the terminal device identifier.

The payment proxy server binds the acquired complete user information to the terminal device identifier and the application identifier, and establishes and saves the payment binding relationship. If the second binding request further includes the express password, the payment proxy server binds the express password to the terminal device identifier, the application identifier, and the complete user information, and establishes the payment binding relationship.

In this way, the first user information and the second user information used for online payment are received by using the first binding request and the second binding request respectively, so that a third party cannot obtain the complete user information, or establish the payment binding relationship among the complete user information obtained by combining the first user information and the second user information after receiving the first user information and the second user information, the terminal device identifier, and the application identifier, which, compared with the prior art, improves security of user information during the online payment, and can ensure capital security of the user.

Further, after the establishing the payment binding relationship according to the first binding request and the second binding request, the method further includes: generating card binding information according to the payment binding relationship, where the card binding information includes the terminal device identifier, the application identifier, and third user information, the terminal device may prompt, according to the third user information, a user to input payment verification information when performing online payment, and the third user information and the payment verification information can form the complete user information. The generated card binding information is sent to the terminal device, so that the terminal device saves the card binding information.

It should be noted that, a process of establishing the payment binding relationship may be performed at the same time as that of an initial payment process, that is, initial payment can be completed and the payment binding relationship can be established by inputting user information twice.

If the user confirms to perform payment in a first application of the terminal device next time, the terminal device first needs to receive a commodity payment request of the user by using the first application, and then determines whether the card binding information stored in the terminal device includes first card binding information or whether another application of the terminal device has already established the payment binding relationship. When the terminal device determines whether the another application of the terminal device has already established the payment binding relationship, the payment proxy server may receive a query request sent by the terminal device; determine, according to the terminal device identifier included in the query request, whether the another application of the terminal device establishes the payment binding relationship; and generate query feedback information according to a determining result, and if the another application of the terminal device has already established the payment binding relationship, the payment proxy server sends the query feedback information to the terminal device, where the query feedback information includes the terminal device identifier of the terminal device and an application identifier of the another application of the terminal device, and further includes partial user information that is of the another application of the terminal device and is used for establishing the payment binding relationship.

Further, when the user needs to perform payment in the first application, the payment proxy server may further receive a first payment request sent by the terminal device, where the first payment request includes the first card binding information and payment verification information that is input by the user, and the first card binding information includes the terminal device identifier, an application identifier of the first application, and the third user information; acquire the terminal device identifier and the application identifier of the first application according to the first card binding information, then acquire, according to the terminal device identifier and the application identifier of the first application, complete user information bound to the terminal device identifier and the application identifier of the first application, and then generate local payment verification information according to a preset rule and according to third user information included in the first card binding information and the complete user information; determine whether the payment verification information that is input by the user is the same as the local payment verification information; and send a second payment request to a payment system when the payment verification information that is input by the user is the same as the local payment verification information, so that the payment system pays network fees. It should be noted that, if the payment binding relationship established by the payment proxy server further includes the express password, the local payment verification information may also be the express password, and the payment proxy server may determine whether to generate the second payment request by determining whether a local express password is the same as the express password input by the user.

In the online payment method provided in this embodiment of the present invention, before online payment is performed, a payment binding relationship is first established among complete user information, a terminal device identifier and an application identifier, and when the payment binding relationship is established, the complete user information used for online payment is separately received by using a first binding request and a second binding request, so that a third party cannot obtain complete user information; moreover, after the complete user information is obtained, the payment binding relationship is established, a user can complete the payment according to the payment binding relationship as long as the user inputs payment verification information, without needing to input the complete user information again, which, compared with the prior art, improves security of user information during the online payment, and can ensure capital security of the user.

Figure 3A:
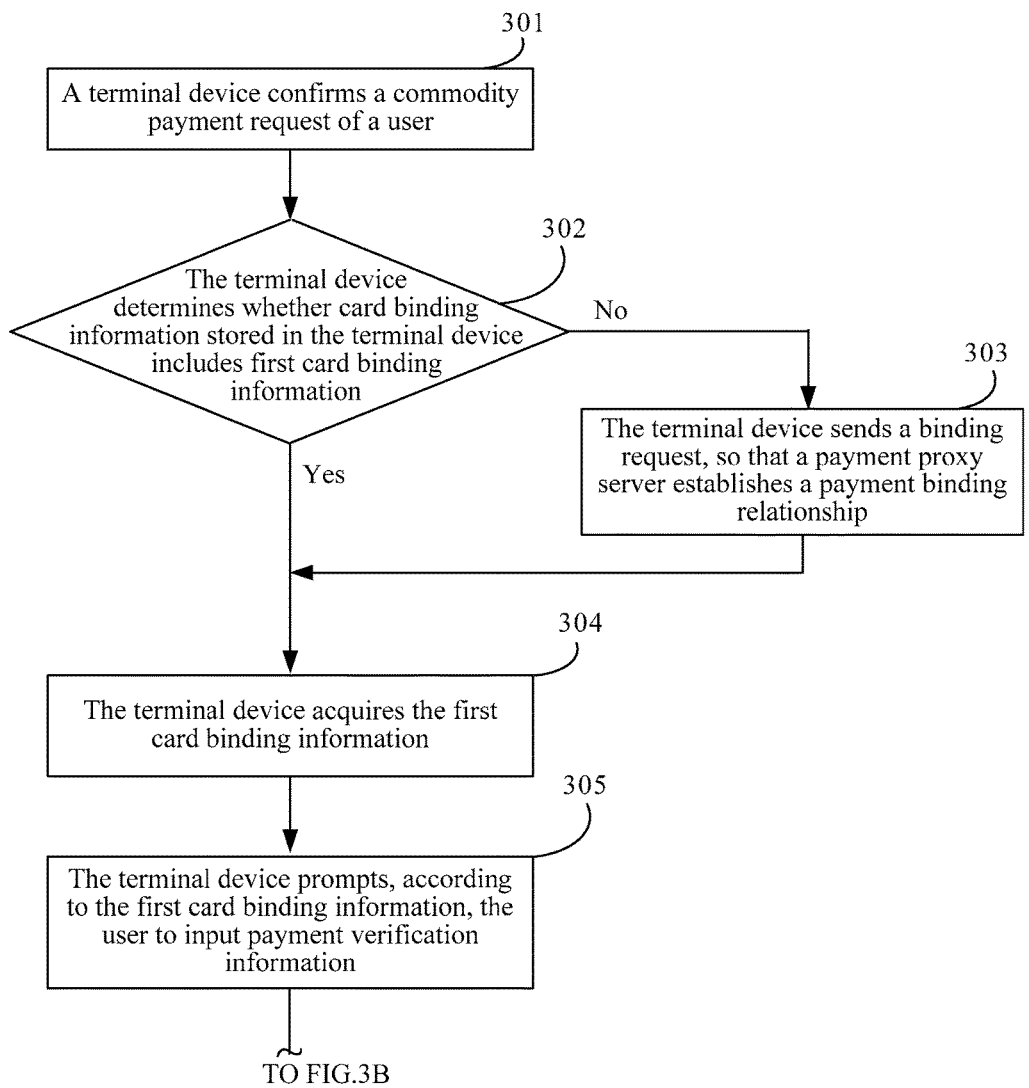
FIG. 3A and FIG. 3B are a flowchart of still another online payment method according to an embodiment of the present invention.
Figure 3B:
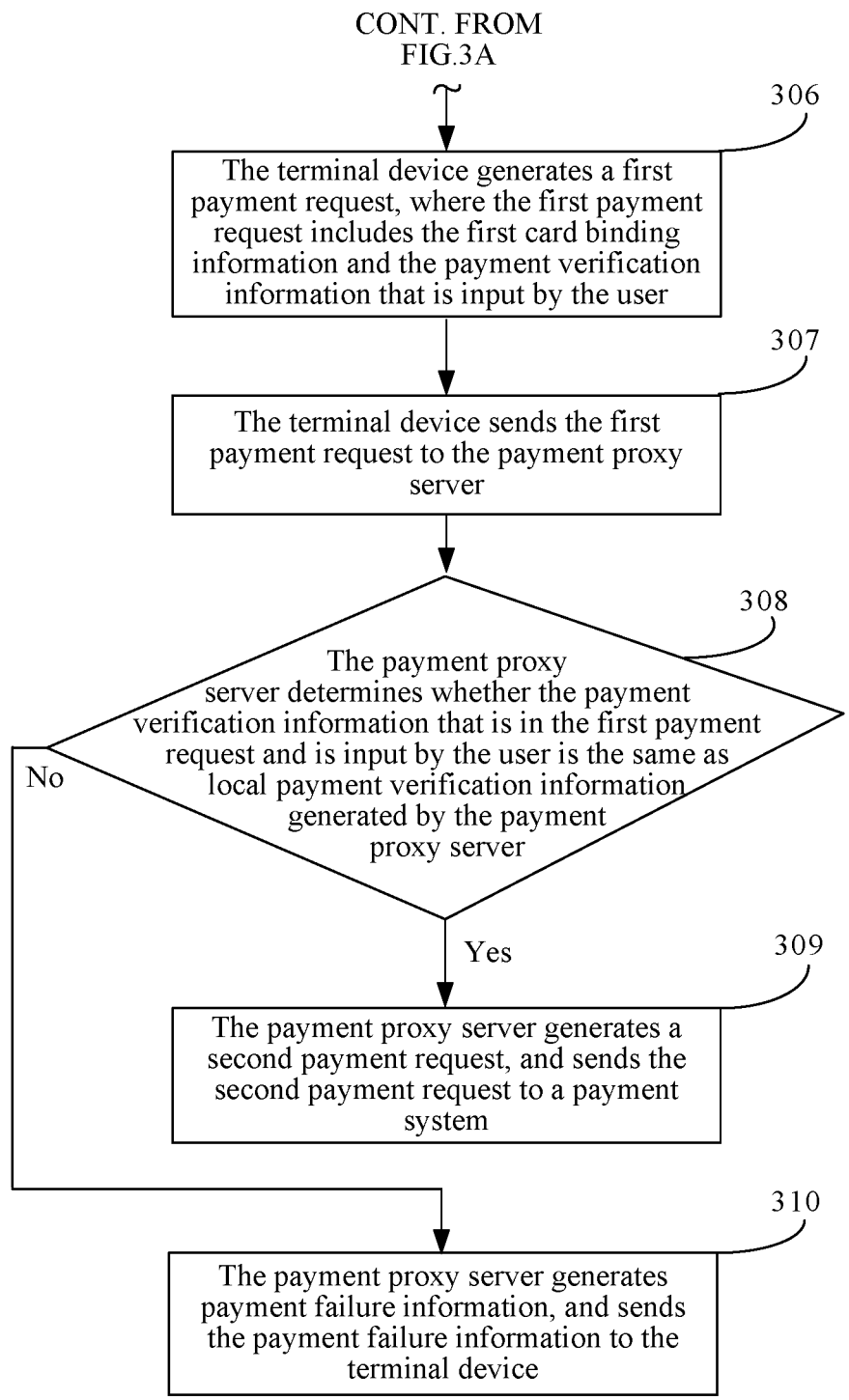

An embodiment of the present invention provides an online payment method, as shown in FIG. 3A and FIG. 3B, including:

Step 301: A terminal device confirms a commodity payment request of a user, and performs step 302.

When using a first application in the terminal device, the user needs to purchase a piece of commodity in the first application, and in this case, the terminal device receives a commodity online payment request of the user by using the first application.

Step 302: The terminal device determines whether card binding information stored in the terminal device includes first card binding information; if the card binding information stored in this terminal device does not include the first card binding information, performs step 303; and if the card binding information stored in this terminal device includes the first card binding information, performs step 314.

If the information stored in the terminal device includes the first card binding information, it is determined that the first application of the terminal device has already established a payment binding relationship. In actual application, the terminal device may further determine, by sending a query request to a payment proxy server, whether another application of the terminal device has already established the payment binding relationship, and after receiving the query request, the payment proxy server queries, according to a terminal device identifier in the query request, whether the another application of the terminal device has already established the payment binding relationship, and then sends query feedback information to the terminal device. After receiving the query feedback information sent by the payment proxy server, the terminal device determines whether the query feedback information includes the terminal device identifier, the application identifier, and the partial user information, and if the terminal device identifier included in the query feedback information is the same as a local terminal device identifier of the terminal device, it may be determined that the another application of the terminal device has already established the payment binding relationship, and the terminal device may prompt, by using partial user information included in a query feedback request, the user to perform online payment.

Step 303: The terminal device sends a binding request, so that a payment proxy server establishes a payment binding relationship.

Figure 4:
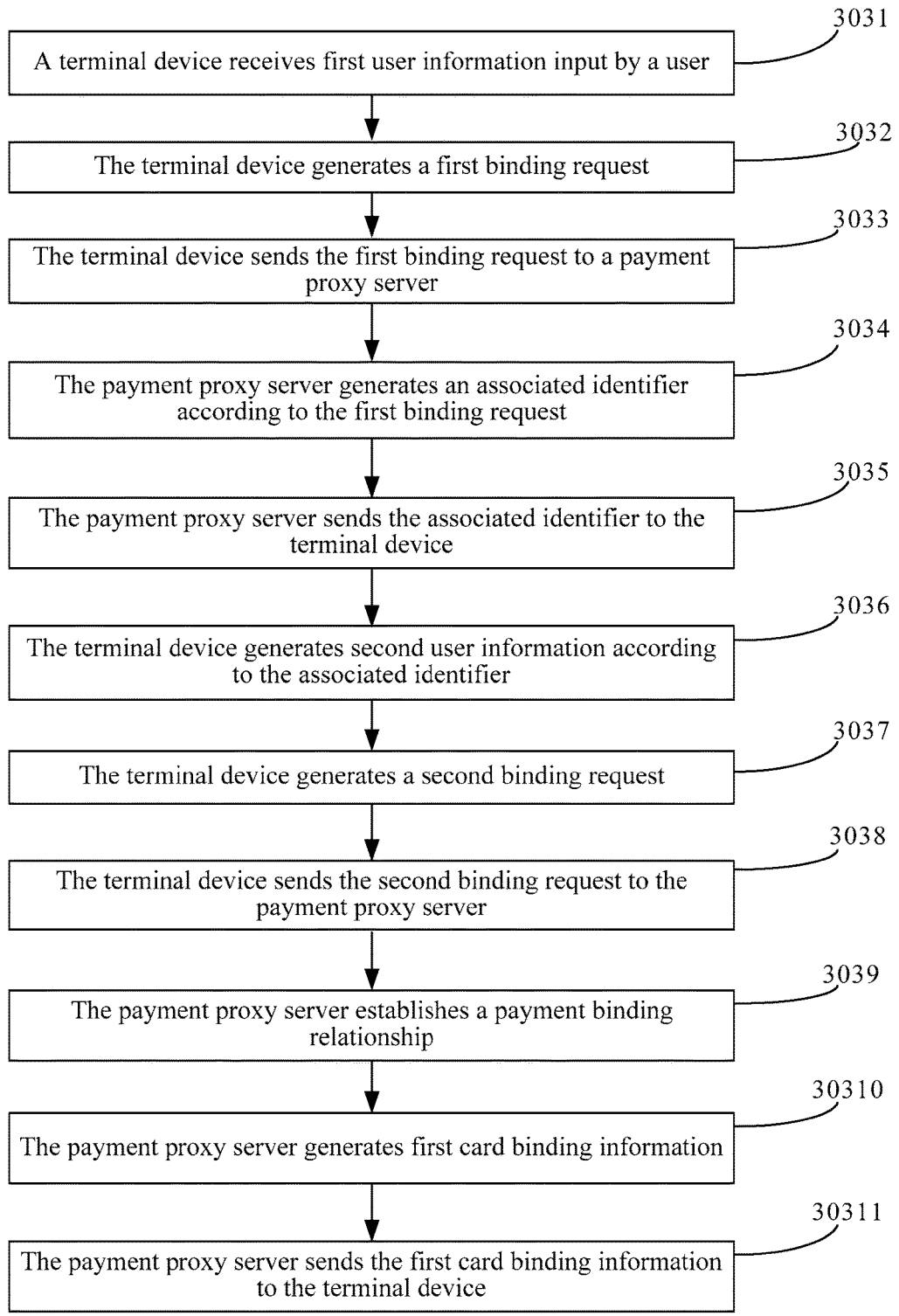
FIG. 4 is a flowchart of yet another online payment method according to an embodiment of the present invention.

The terminal device sends complete user information, the application identifier, and the terminal device identifier that are used for online payment to the payment proxy server, where the complete user information is separately sent to the payment proxy server by using first user information and second user information, and the payment proxy server establishes the payment binding relationship according to the complete user information, the terminal device identifier, and the application identifier. As shown in FIG. 4, specific steps are step 3031 to step 30311.

Step 3031: The terminal device receives first user information input by the user, and performs step 3032.

The terminal device prompts the user to input the first user information, where the first user information may be partial user information that is of the user and is used for online payment, is generally an incomplete bank card number, that is, when the user inputs the first user information, the user may input a part of the bank card number, and the part of the bank card number may be first several digits of the bank card number, or may be last several digits, or may be further several random digits or all digits of the bank card number, which may be self-defined according to a user habit. In this embodiment of the present invention, the user information is a bank card number of nineteen digits, and the first user information input by the user is first six digits of the bank card number.

Step 3032: The terminal device generates a first binding request, and performs step 3033.

The terminal device generates the first binding request according to the first user information input by the user, an application identifier of the first application, and a terminal device identifier of the terminal device, where the first binding request includes the first user information, the application identifier, and the terminal device identifier.

Step 3033: The terminal device sends the first binding request to the payment proxy server, and performs step 3034.

In this embodiment of the present invention, the terminal device may send the first binding request to the payment proxy server by using a payment SDK installed in the first application.

Step 3034: The payment proxy server generates an associated identifier according to the first binding request, and performs step 3035.

After receiving the first binding request sent by the terminal device, the payment proxy server acquires the terminal device identifier, application identifier, and the first user information that are included in the first binding request, and generates an associated identifier, where the associated identifier is associated with the terminal device identifier, the application identifier, and the first user information. In actual application, a process of establishing a payment binding relationship may be performed at the same time as that of initial payment, and therefore the associated identifier further includes an identifier used for instructing the user to input a bank card password and payment information for the user to confirm payment, for example, information such as purchased commodity, an amount of money needing to be paid, and a payment link, so that the user definitely understands specific content of payment confirmed by the user. The associated identifier may further include an identifier for prompting the user to input an express password, so that the user selects according to a habit whether to set the express password for the payment binding relationship.

Step 3035: The payment proxy server sends the associated identifier to the terminal device, and the terminal device performs step 3036.

Specifically, the payment proxy server may directly send the associated identifier to the terminal device by using the payment SDK, or may first send the associated identifier to a message push server, then the message push server sends the associated identifier to a message push client installed in the terminal device, and then the terminal device acquires the associated identifier by using the message push client. In actual application, the payment proxy server generally sends the associated identifier by using a message push system.

After sending the associated identifier to the terminal device, the payment proxy server may further receive a user information request sent by the terminal device, where the user information request includes the associated identifier, acquire the first user information according to the associated identifier, and then generate preset location information of the first user information according to a preset rule, where the preset location information of the first user information may be where information about several digits that are of the first user information and are set according to the preset rule, remaining information may be replaced with "*", and the preset rule may be set according to a case. The payment proxy server sends the preset location information of the first user information to the terminal device, so that the terminal device prompts, according to the preset location information of the first user information, the user to input remaining user information used for performing online payment other than the first user information.

Step 3036: The terminal device generates second user information according to the associated identifier, and performs step 3037.

After receiving the associated identifier sent by the payment proxy server, the terminal device sends the user information request to the payment proxy server, receives preset location information of the first user information sent by the payment proxy server, and then prompts, according to the preset location information of the first user information, the user to input remaining user information used for performing online payment other than the first user information, and the terminal device generates the second user information according to the remaining user information input by the user, where the first user information and the second user information are used for forming the complete user information. If the associated identifier further includes an identifier for prompting the user to input the express password, the terminal device may further instruct, according to the identifier, the user to input the express password. If initial payment is completed while a payment binding process is established, the associated identifier should further include the payment information for the user to confirm payment, where the payment information is information such as purchased commodity, an amount of money needing to be paid, and a payment link, and the user determines whether the confirmed payment is needed online payment according to the payment information, and completes payment according to the payment link provided in the payment information.

Step 3037: The terminal device generates a second binding request, and performs step 3038.

If the first user information in this embodiment is information about first six digits of a bank card number, the preset location information of the first user information generated by the payment proxy server according to the preset rule is separately the first digit, the third digit, and the fifth digit of the bank card number, and the second digit, the fourth digit, and the sixth digit of the bank card number that are remaining are replaced with "*", the terminal device prompts, according to the preset location information of the first user information, the user to input remaining user information of the user information used for online payment, where the remaining user information is last thirteen digits of the bank card number, and the first digit, the third digit, and the fifth digit of the bank card number are the same as the first digit, the third digit, and the fifth digit of the preset location information of the first user information. After the user completes input according to a prompt, the terminal device receives the remaining user information input by the user, and generates the second user information, where the second user information is the remaining user information used for input. The terminal device generates the second binding request according to the second user information, the terminal device identifier, and the application identifier of the first application. It should be noted that, if the user also inputs the bank card password according to a prompt of the associated identifier, the second binding request also includes the bank card password.

Step 3038: The terminal device sends the second binding request to the payment proxy server, and performs step 3039.

The terminal device may send the second binding request to the payment proxy server by using the payment SDK installed in the first application.

Step 3039: The payment proxy server establishes the payment binding relationship, and performs step 30310.

After receiving the second binding request sent by the terminal device, the payment proxy server first acquires the second user information and the associated identifier that are in the second binding request, acquires, according to the associated identifier, the first user information, application identifier, and the terminal device identifier that are previously stored, and combines the first user information and the second user information in the second binding request to form the complete user information. The complete user information is bound to the terminal device identifier, and the application identifier of the first application, and the payment binding relationship is established. In this embodiment, the second user information included in the second binding request is last thirteen digits of a bank card number, and the payment proxy server combines first six digits of the bank card number in the first binding request and last thirteen digits of the bank card number in the second binding request to form the complete bank card number of nineteen digits. If the second binding request further includes the express password, the payment proxy server binds the express password to the terminal device identifier, the application identifier, and the complete user information, and establishes the payment binding relationship. The first user information and the second user information used for online payment are received by using the first binding request and the second binding request respectively, so that a third party cannot obtain the complete user information, or establish the payment binding relationship among the complete user information, the terminal device identifier, and the application identifier, which, compared with the prior art, improves security of user information during the online payment, and can ensure capital security of the user.

Step 30310: The payment proxy server generates the first card binding information, and performs step 30311.

After establishing the payment binding relationship, the payment proxy server generates the first card binding information. The first card binding information includes the terminal device identifier, the application identifier of the first application, and third user information. When performing online payment, the terminal device may prompt, according to the third user information, the user to input payment verification information, where the third user information and the payment verification information can form the complete user information. In actual application, the third user information included in the first card binding information may be user information of several random digits of the complete user information, such as, may be any n digits of the bank card number, where n≤19.

Step 30311: The payment proxy server sends the first card binding information to the terminal device.

The generated first card binding information is sent to the terminal device, so that the terminal device saves the first card binding information, the terminal device may save the first card binding information into a local storage device or into a payment SDK of a local first application, and therefore the terminal device determines, according to the first card binding information, whether the first application of the terminal device establishes the payment binding relationship.

Step 304: The terminal device acquires the first card binding information, and performs step 305.

If the first application of the terminal device has already established the payment binding relationship, when confirming payment in the terminal device again, the user first acquires the first card binding information from locally stored card binding information.

Step 305: The terminal device prompts, according to the first card binding information, the user to input payment verification information, and performs step 306.

Assuming that the third user information in the first card binding information is n random digits of a bank card number, where n<19, the terminal device prompts the user to input remaining (19-n) digits of the bank card number, and the payment verification information is the remaining (19-n) digits of the bank card number; if when the payment binding relationship is established, the user sets an express password according to a prompt, the terminal device prompts the user to input the express password, and the payment verification information is the express password.

Assuming that the user further needs to purchase commodity in a second application later, where the second application is any other application in the terminal device than the first application, the terminal device determines, according to the terminal device identifier, the application identifier of the first application, and the partial user information that are included in the query feedback information sent by the payment proxy server that the first application of the terminal device has already established the payment binding relationship, where the partial user information may be the third user information in the first card binding information, and then the terminal device prompts, according to the partial user information, the user to input the payment verification information, so as to complete commodity payment of the user in the second application.

Step 306: The terminal device generates a first payment request, where the first payment request includes the first card binding information and the payment verification information that is input by the user, and performs step 307.

After receiving the payment verification information that is input by the user, the terminal device generates the first payment request, where the first payment request includes the first card binding information and the payment verification information that is input by the user. If the terminal device further needs to perform commodity payment in the second application later, a second payment request generated by the terminal device includes the terminal device identifier, an application identifier of the second application, and the payment verification information.

Step 307: The terminal device sends the first payment request to the payment proxy server, and performs step 308.

The terminal device may send the first payment request to the payment proxy server by using the payment SDK installed in the first application; and if the user confirms again that a payment application is the second application, the terminal device may send the first payment request to the payment proxy server by using the payment SDK installed in the second application.

Step 308: The payment proxy server determines whether the payment verification information that is in the first payment request and is input by the user is the same as local payment verification information generated by the payment proxy server; if the same, performs step 309; and if different, performs step 310.

After receiving the first payment request, the payment proxy server acquires the terminal device identifier and the application identifier of the first application according to the first card binding information, then acquires, according to the terminal device identifier and the application identifier of the first application, complete user information bound to the terminal device identifier and the application identifier of the first application, and then generates local payment verification information according to a preset rule and according to third user information included in the first card binding information and the complete user information; and then determines whether the payment verification information that is input by the user is the same as the local payment verification information. For example, if the local payment verification information generated by the payment proxy server according to the third user information in the first card binding information and the complete user information is (19-n) digits of a bank card number, and the payment verification information input by the user according to a prompt of the terminal device is also (19-n) digits of the bank card number, the payment proxy server needs to determine whether the locally generated (19-n) digits of the bank card number is the same as the (19-n) digits of the bank card number that are input by the user. Alternatively, if when the payment binding relationship is established, the user sets an express password, the payment proxy server acquires a locally stored express password according to the terminal device identifier and the application identifier that are of the first card binding information, and then determines whether the locally stored express password is the same as the express password input by the user.

Step 309: The payment proxy server generates a second payment request, and sends the second payment request to a payment system, so that the payment system confirms payment.

If the payment verification information that is input by the user is the same as the payment verification information locally generated by the payment proxy server, the payment proxy server acquires the complete user information, that is, the complete bank card number and a payment amount of money confirmed by the user, generates the second payment request, and sends the second payment request to the payment system, so that the payment system completes this online payment.

Step 310: The payment proxy server generates payment failure information, and sends the payment failure information to the terminal device.

If the payment verification information that is input by the user is different from the payment verification information locally generated by the payment proxy server, the payment proxy server generates the payment failure information, and sends the payment failure information to the terminal device, and the terminal device prompts, according to the payment failure information, the user to input the payment verification information again or ends this online payment.

In the online payment method provided in this embodiment of the present invention, before online payment is performed in a first application, it is first determined whether the first application has already established a payment binding relationship; if the first application has not established the payment binding relationship, the payment binding relationship among complete user information used for performing online payment, a terminal device identifier, and an identifier of the first application is first established, and when the payment binding relationship is established, the complete user information used for online payment is received by using a first binding request and a second binding request separately, so that a third party cannot obtain complete user information; moreover, after the payment binding relationship is established, a user can complete the payment as long as the user inputs payment verification information, without needing to input the complete user information again, which, compared with the prior art, improves security of user information during the online payment, and can ensure capital security of the user.

Figure 5:
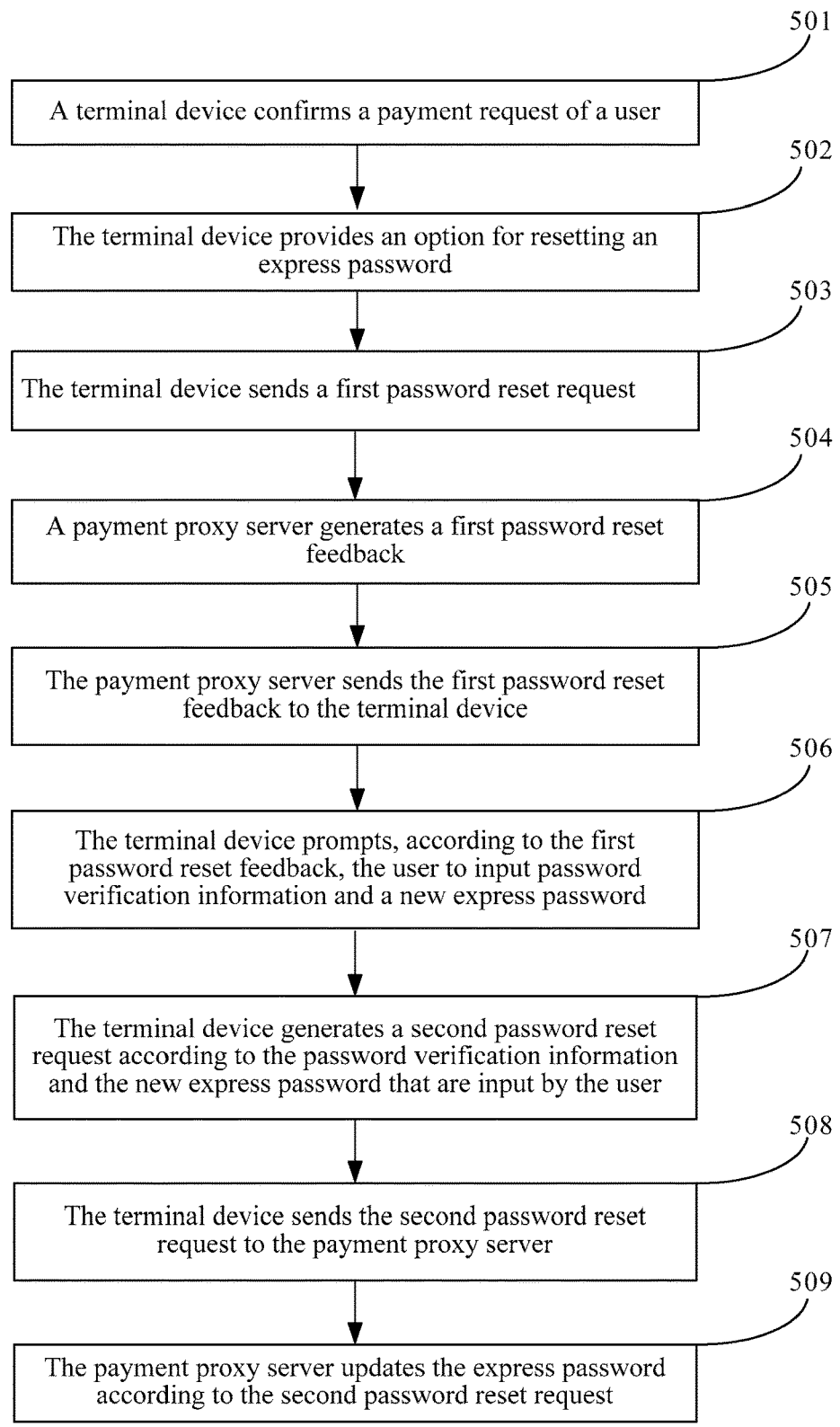
FIG. 5 is a flowchart of a method for updating an express password according to an embodiment of the present invention.

After step 303, when the user sets an express password in a process of establishing the payment binding relationship, but forgets the express password in a subsequent payment process, the user cannot correctly input payment verification information and therefore cannot complete online payment. In this case, an embodiment of the present invention further provides a processing process used for the user to set a new express password, as shown in FIG. 5, including:

Step 501: A terminal device confirms a payment request of a user, and performs step 502.

The user confirms to perform payment in a first application, a payment binding relationship exists in the first application, and the user sets an express password when the payment binding relationship is established.

Step 502: The terminal device provides an option for resetting an express password, and performs step 503.

If the user forgets the express password during payment, the terminal device provides the option for resetting an express password, and the user may select the option to enter a process of resetting an express password. The option for resetting an express password provided by the terminal device may be provided by using a link for resetting an express password, or may be provided by a selection button bound to a link for resetting an express password, which is not limited in this embodiment of the present invention.

Step 503: The terminal device sends a first password reset request, and performs step 504.

The terminal device detects that the user selects the option for resetting an express password, determines that the user needs to reset the express password, and then the terminal device generates the first password reset request, where the first password reset request includes a terminal device identifier, and an application identifier of the first application.

Step 504: A payment proxy server generates a first password reset feedback, and performs step 505.

After receiving the first password reset request sent by the terminal device, the payment proxy server queries the payment binding relationship between the terminal device and the application identifier according to the terminal device identifier and the application identifier that are included in the first password reset request. When the payment binding relationship has already established between the terminal device and the application identifier, the payment proxy server acquires, according to the terminal device and the application identifier, complete user information bound to the payment binding relationship established between the terminal device and the application identifier, then acquires partial user information according to a preset rule, and generates the first password reset feedback, where first password reset feedback includes the terminal device identifier, the application identifier of the first application, and the partial user information. After generating the first password reset feedback, the payment proxy server generates local password verification information according to the partial user information and the complete user information.

Step 505: The payment proxy server sends the first password reset feedback to the terminal device, and the terminal device performs step 506.

The payment proxy server sends the first password reset feedback to the terminal device, and specifically, the first password reset feedback may be sent by using a payment SDK in the first application, or may be sent by using a message push server.

Step 506: The terminal device prompts, according to the first password reset feedback, the user to input password verification information and a new express password, and performs step 507.

After receiving the first password reset feedback sent by the payment proxy server, the terminal device determines, according to the terminal device identifier and the application identifier of the first application that are in the first password reset feedback, that an express password of the first application of the terminal device is reset; and then prompts, according to the partial user information in the first password reset feedback, the user to input the password verification information and the new express password.

Step 507: The terminal device generates a second password reset request according to the password verification information and the new express password that are input by the user, and performs step 508.

The terminal device separately receives the password verification information and the new express password that are input by the user, and then generates the second password reset request, where the second password reset request includes an express password reset by the user, the password verification information, the terminal device identifier, and the first application identifier.

Step 508: The terminal device sends the second password reset request to the payment proxy server, and performs step 509.

The terminal device sends a second transaction associated identifier to the payment proxy server by using the payment SDK of the first application.

Step 509: The payment proxy server updates the express password according to the second password reset request.

The payment proxy server receives the second password reset request sent by the terminal device, queries, by using the terminal device identifier and the first application identifier that are in the second password reset request, the local password verification information generated by the payment proxy server, determines whether the local password verification information is the same as the password verification information that is in the second password reset request and is input by the user, and if the local password verification information is the same as the password verification information that is in the second password reset request and is input by the user, updates the previous express password to the new express password that is in the second password reset request and is input by the user.

It should be noted that, a sequence of the steps of the online payment method provided in this embodiment of the present invention may be appropriately adjusted, or a step may be correspondingly added or deleted according to a case. Any varied method readily figured out by a person skilled in the art within the technical scope disclosed in the present invention shall fall within the protection scope of the present invention, which is therefore not described again.

In the method for resetting an express password provided in this embodiment of the present invention, when a user forgets an express password, a terminal device first sends a request for resetting the express password, a payment proxy server instructs, according to the request for resetting the express password, the terminal device to receive password verification information that is of a new express password and is input by the user, and then the payment proxy server determines whether the password verification information input by the user is the same as local password verification information, and resets the express password on the premise that the two are the same, which, compared with the prior art, improves security of user information in a process of resetting the express password.

Figure 6:
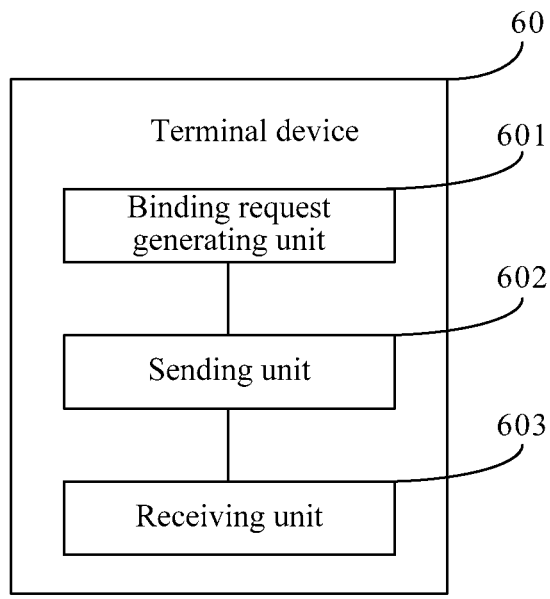
FIG. 6 is a schematic structural diagram of a terminal device according to an embodiment of the present invention.

An embodiment of the present invention provides a terminal device 60, as shown in FIG. 6, including:

a binding request generating unit 601, configured to generate information about a first binding request, where the first binding request includes first user information, an application identifier, and a terminal device identifier;

a sending unit 602, configured to send the first binding request generated by the binding request generating unit 601 to a payment proxy server, so that the payment proxy server generates an associated identifier according to the first binding request, where the associated identifier is associated with the first user information, the application identifier, and the terminal device identifier; and a receiving unit 603, configured to receive the associated identifier sent by the payment proxy server.

The binding request generating unit 601 is further configured to generate a second binding request according to the associated identifier received by the receiving unit 603, where the second binding request includes second user information and the associated identifier, and the second user information and the first user information are used for forming complete user information.

The sending unit 602 is further configured to send the second binding request generated by the binding request generating unit 601 to the payment proxy server, so that the payment proxy server acquires the first user information, the application identifier, and the terminal device identifier according to the first binding request, acquires the second user information according to the second binding request, then acquires the complete user information according to the first user information and the second user information, and establishes a payment binding relationship according to the complete user information, the application identifier, and the terminal device identifier, where the payment binding relationship is used for indicating a binding relationship among the complete user information, the application identifier, and the terminal device identifier.

In this way, the user information used for online payment is divided into the first user information and the second user information, and the sending unit sends the first user information and the second user information by using the first binding request and the second binding request respectively, so that a third party cannot obtain the complete user information, which, compared with the prior art, improves security of the user information during the online payment, and can ensure capital security of the user.

Specifically, the binding request generating unit 601 is specifically configured to:

send a user information request to the payment proxy server according to the associated identifier, so that the payment proxy server sends preset location information of the first user information to the terminal device according to the user information request;

receive the preset location information that is of the first user information and is sent by the payment proxy server;

generate the second user information according to the preset location information of the first user information, where the second user information and the first user information are used for forming the complete user information; and generate the second binding request, where the second binding request includes the second user information and the associated identifier.

Further, the receiving unit 603 is further configured to:

receive card binding information sent by the payment proxy server, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information.

Figure 7:
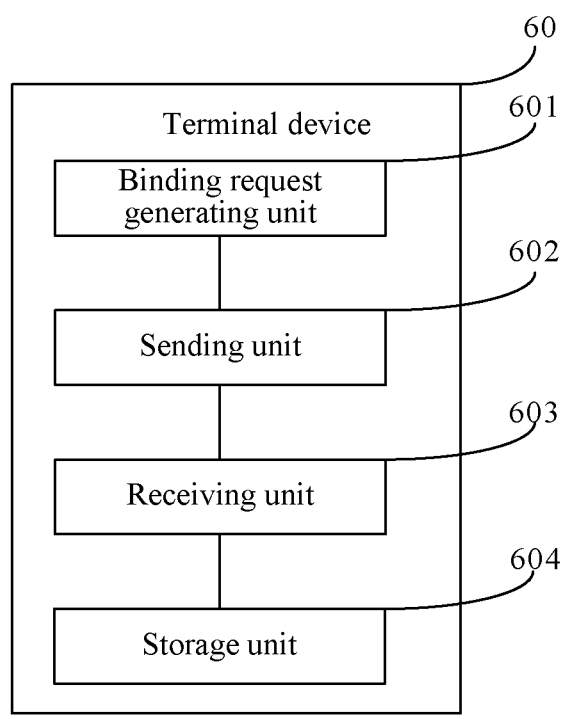
FIG. 7 is a schematic structural diagram of another terminal device according to an embodiment of the present invention.

As shown in FIG. 7, the terminal device further includes a storage unit 604, configured to save the card binding information.

Figure 8:
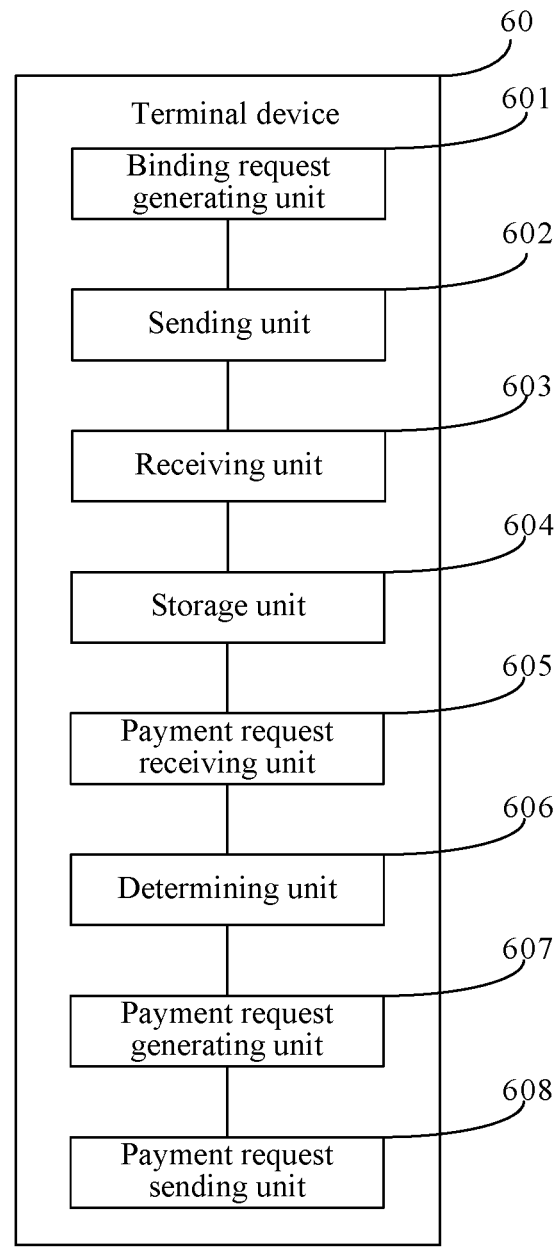
FIG. 8 is a schematic structural diagram of still another terminal device according to an embodiment of the present invention.

As shown in FIG. 8, the terminal device further includes a payment request receiving unit 605, configured to receive a commodity payment request of the user by using a first application, where the first application is an application in the terminal device;

a determining unit 606, configured to determine whether the card binding information stored in the terminal device includes first card binding information according to the terminal device identifier and an application identifier of the first application, where the first card binding information includes the terminal device identifier and the application identifier of the first application; and a payment request generating unit 607, configured to generate a first payment request when the information stored in the terminal device includes the first card binding information; and a payment request sending unit 608, configured to send the first payment request to the payment proxy server, so that the payment proxy server determines according to the first payment request whether to pay network fees.

Specifically, the payment request generating unit 605 is specifically configured to:

acquire the first card binding information; acquire the third user information included in the first card binding information according to the first card binding information; prompt the user to input the payment verification information according to a preset rule and according to the third user information included in the first card binding information; receive the payment verification information that is input by the user; and generate the first payment request, where the first payment request includes the first card binding information and the payment verification information that is input by the user.

In the terminal device provided in this embodiment of the present invention, before online payment is performed, a payment binding relationship is first established, and when the payment binding relationship is established, user information used for online payment is divided into first user information and second user information, and the first user information and the second user information are sent by using a first binding request and a second binding request respectively, so that a third party cannot obtain complete user information; moreover, after the payment binding relationship is established, a user can complete the payment according to the payment binding relationship as long as the user inputs payment verification information, without needing to input the complete user information again, which, compared with the prior art, improves security of user information during the online payment, and can ensure capital security of the user.

Figure 9:
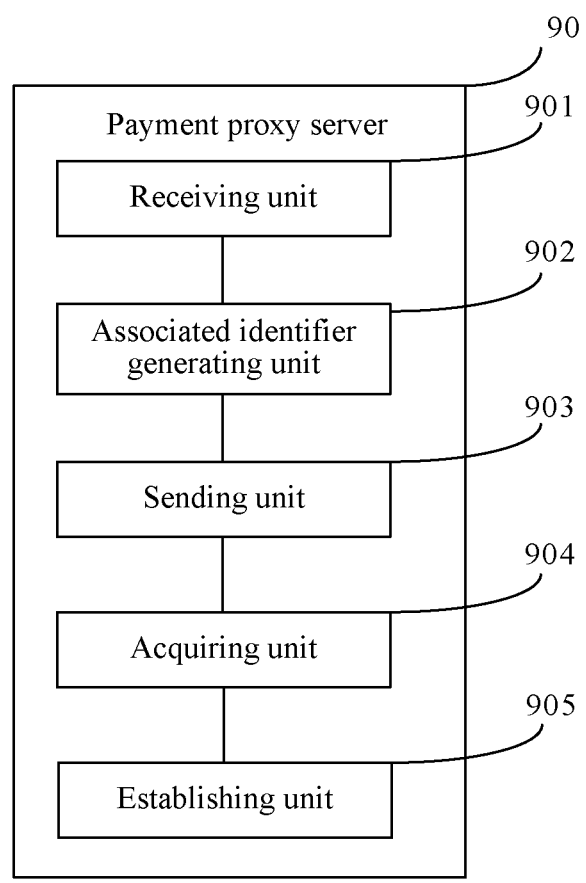
FIG. 9 is a schematic structural diagram of a payment proxy server according to an embodiment of the present invention.

An embodiment of the present invention provides a payment proxy server 90, as shown in FIG. 9, including:

a receiving unit 901, configured to receive a first binding request sent by a terminal device, where the first binding request includes first user information, an application identifier, and a terminal device identifier;

an associated identifier generating unit 902, configured to generate an associated identifier according to the first binding request received by the receiving unit 901, where the associated identifier is associated with the first user information, the application identifier, and the terminal device identifier;

a sending unit 903, configured to send the associated identifier generated by the associated identifier generating unit 902 to the terminal device, so that the terminal device generates a second binding request according to the associated identifier, where the second binding request includes second user information and the associated identifier, and the second user information and the first user information are used for forming complete user information, where the receiving unit 901 is further configured to receive the second binding request sent by the terminal device;

an acquiring unit 904, configured to acquire the complete user information, the application identifier, and the terminal device identifier according to the first binding request and the second binding request that are received by the receiving unit 901; and an establishing unit 905, configured to establish a payment binding relationship according to the complete user information, the application identifier, and the terminal device identifier, where the payment binding relationship is used for indicating a binding relationship among the complete user information, the application identifier, and the terminal device identifier.

In this way, the receiving unit receives the first user information and the second user information used for online payment by using the first binding request and the second binding request respectively, so that a third party cannot obtain the complete user information, or establish the payment binding relationship among the complete user information, the terminal device identifier, and the application identifier by using the establishing unit, which, compared with the prior art, improves security of user information during the online payment, and can ensure capital security of the user.

Specifically, the acquiring unit 904 is specifically configured to:

acquire the second user information and the associated identifier from the second binding request; acquire the first user information, the application identifier, and the terminal device identifier according to the associated identifier; and combine the first user information and the second user information to form the complete user information.

Figure 10:
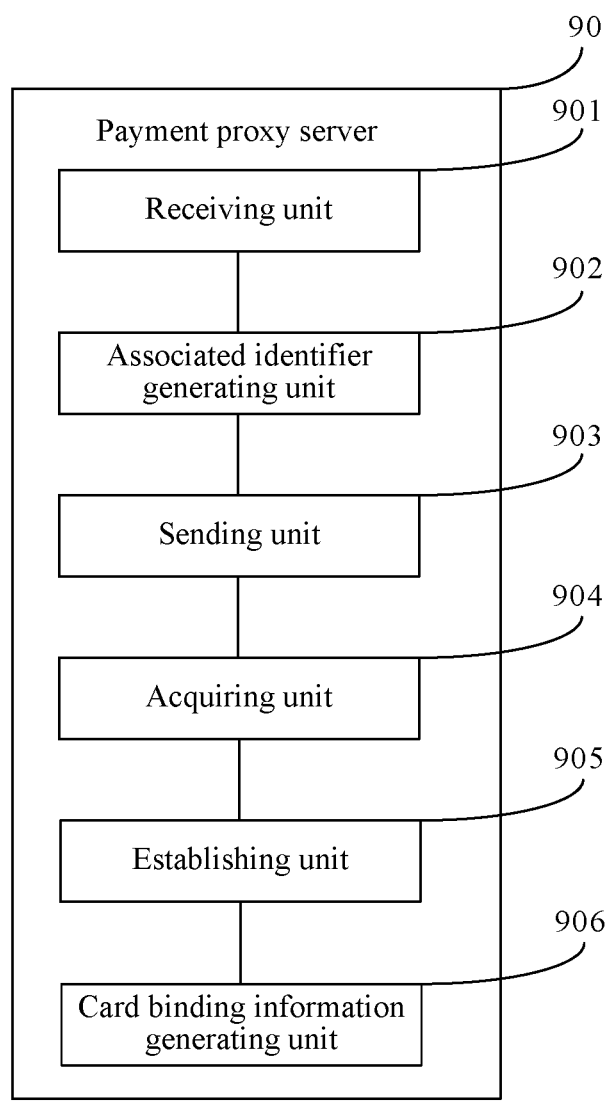
FIG. 10 is a schematic structural diagram of another payment proxy server according to an embodiment of the present invention.

Further, as shown in FIG. 10, the payment proxy server further includes:

a card binding information generating unit 906, configured to generate card binding information according to the payment binding relationship, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information, where the sending unit 903 is further configured to send the card binding information to the terminal device, so that the terminal device saves the card binding information.

Specifically, the receiving unit 901 is further configured to receive a first payment request sent by the terminal device, where the first payment request includes first card binding information and payment verification information that is input by the user, the first card binding information includes the terminal device identifier, an application identifier of a first application, and the third user information, the first application is an application in the terminal device, and the terminal device receives a commodity payment request of the user by using the first application.

The acquiring unit 904 is further configured to:

acquire the terminal device identifier and the application identifier of the first application according to the first card binding information; and acquire, according to the terminal device identifier and the application identifier of the first application, the complete user information bound to the terminal device identifier and the application identifier of the first application.

Figure 11:
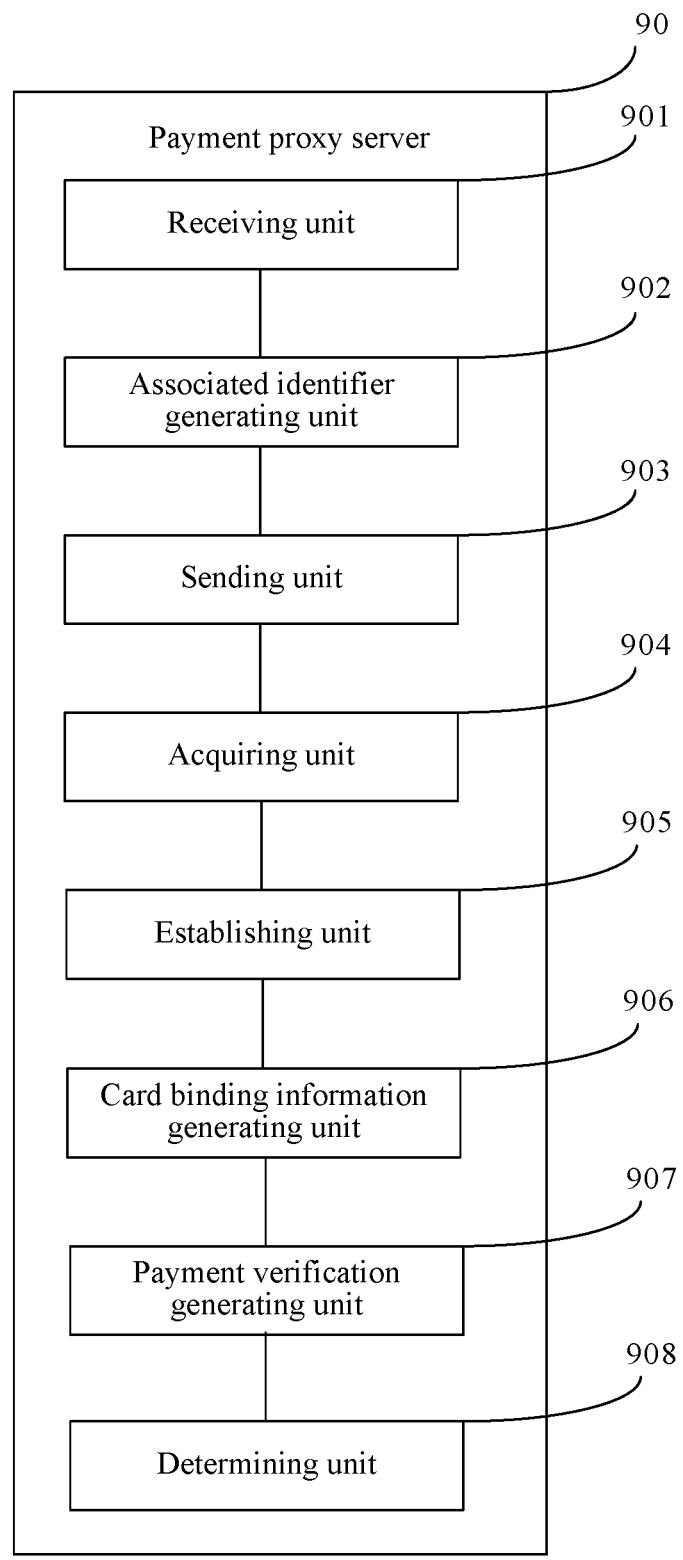
FIG. 11 is a schematic structural diagram of still another payment proxy server according to an embodiment of the present invention.

As shown in FIG. 11, the payment proxy server further includes a payment verification generating unit 907, configured to generate local payment verification information according to a preset rule and according to the third user information included in the first card binding information and the complete user information bound to the terminal device identifier and the application identifier of the first application; and a determining unit 908, configured to determine whether the payment verification information that is input by the user is the same as the local payment verification information.

The sending unit 903 is further configured to send a second payment request to a payment system when the payment verification information that is input by the user is the same as the local payment verification information, so that the payment system pays network fees.

In the payment proxy server provided in this embodiment of the present invention, before online payment is performed, a payment binding relationship is first established, and when the payment binding relationship is established, a receiving unit receives first user information and second user information by using a first binding request and a second binding request respectively, so that a third party cannot obtain complete user information; moreover, after the complete user information is obtained, the payment binding relationship is established by using an establishing unit, a user can complete the payment according to the payment binding relationship as long as the user inputs payment verification information, without needing to input the complete user information again, which, compared with the prior art, improves security of user information during the online payment, and can ensure capital security of the user.

An embodiment of the present invention provides an online payment system, including a terminal device and a payment proxy server.

The terminal device is configured to send a first binding request to the payment proxy server; and send a second binding request to the payment proxy server according to an associated identifier sent by the payment proxy server, so that the payment proxy server acquires complete user information, the application identifier, and the terminal device identifier according to the first binding request and the second binding request, and establishes a payment binding relationship according to the complete user information, the application identifier, and the terminal device identifier; and the terminal device is further configured to receive a commodity payment request of a user by using a first application, and send a first payment request to the payment proxy server when card binding information stored in the terminal device includes first card binding information, so that the payment proxy server determines according to the first payment request whether to pay network fees, where the first card binding information includes the terminal device identifier and an application identifier of the first application.

The payment proxy server is configured to receive the first binding request of the terminal device, generate the associated identifier according to the first binding request, and send the associated identifier to the terminal device, so that the terminal device generates the second binding request according to the associated identifier; and receive the second binding request generated by the terminal device, acquire the complete user information, the application identifier, and the terminal device identifier according to the first binding request and the second binding request, and establish the payment binding relationship according to the complete user information, the application identifier, and the terminal device identifier; and the payment proxy server is further configured to receive the first payment request of the terminal device, generate local payment verification information according to the first payment request, and send a second payment request to a payment system when payment verification information that is input by the user and included in the first payment request is the same as the local payment verification information, so that the payment system pays network fees.

In the online payment system provided in the embodiments of the present invention, before online payment is performed, a payment binding relationship is first established; when the payment binding relationship is established, a terminal device divides user information used for the online payment into first user information and second user information and separately sends the first user information and the second user information; and a payment proxy server receives the first user information and the second user information by using a first binding request and a second binding request, so that a third party cannot obtain complete user information; moreover, after the complete user information is obtained, the payment binding relationship is established, and a user can complete the payment according to the payment binding relationship as long as the user inputs payment verification information, without needing to input the complete user information again, which, compared with the prior art, improves security of user information during the online payment, and can ensure capital security of the user.

Figure 12:
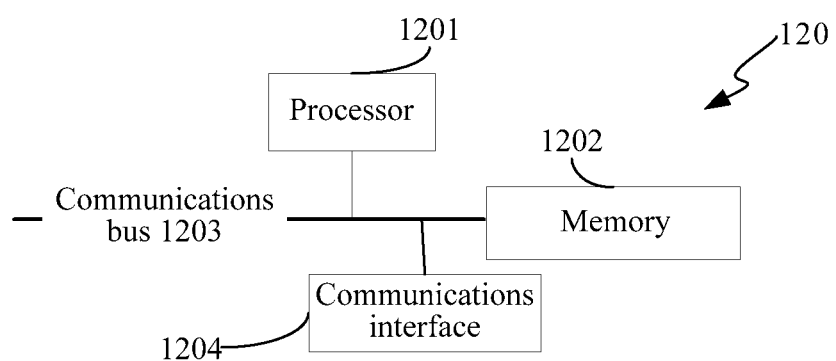
FIG. 12 is a schematic structural diagram of yet another terminal device according to an embodiment of the present invention.

An embodiment of the present invention provides a terminal device 120. As shown in FIG. 12, the terminal device 120 includes: a processor 1201, a memory 1202, a communications bus 1203, and a communications interface 1204.

The communications bus 1203 is configured to implement connection and communication between the processor 1201 and the memory 1202.

The processor 1201 may be a CPU (central processing unit, central processing unit), or an ASIC (Application Specific Integrated Circuit, application-specific integrated circuit), or one or more integrated circuits configured to implement this embodiment of the present invention. The processor 1201 is configured to execute an executable module stored in the memory 1202, such as a computer program.

The memory 1202 may include a RAM (Random Access Memory, high-speed random access memory), or may further include a non-volatile memory (non-volatile memory), such as at least one magnetic disk storage. The memory 1202 is configured to store the executable module, where the executable module may be program code, and the program code includes a computer operation instruction.

The communications interface 1204 may be a wireless interface, or may be a wired interface, and is configured to implement communication and connection between the terminal device and another network element, for example, the processor 1201 receives data or executes a program by using the communications interface 1204.

Exemplarily, the processor 1201 executes a computer execution instruction stored in the memory 1202, and is configured to generate a first binding request, where the first binding request includes first user information, an application identifier, and a terminal device identifier; send the first binding request to a payment proxy server, so that the payment proxy server generates an associated identifier according to the first binding request, where the associated identifier is associated with the first user information, the application identifier, and the terminal device identifier; then receive the associated identifier sent by the payment proxy server; generate a second binding request according to the associated identifier, where the second binding request includes second user information and the associated identifier, and the second user information and the first user information are used for forming complete user information; send the second binding request to the payment proxy server, so that the payment proxy server acquires the first user information, the application identifier, and the terminal device identifier according to the first binding request, acquires the second user information according to the second binding request, then acquires the complete user information according to the first user information and the second user information, and establishes a payment binding relationship according to the complete user information, the application identifier, and the terminal device identifier, where the payment binding relationship is used for indicating a binding relationship among the complete user information, the application identifier, and the terminal device identifier.

Further, the processor 1201 is specifically configured to send a user information request to the payment proxy server according to the associated identifier, so that the payment proxy server sends preset location information of the first user information to the terminal device according to the user information request; then receive the preset location information that is of the first user information and is sent by the payment proxy server; generate the second user information according to the preset location information of the first user information, where the second user information and the first user information are used for forming the complete user information; and generate the second binding request according to the second user information and the associated identifier, where the second binding request includes the second user information and the associated identifier.

Specifically, the processor 1201 is further configured to receive card binding information sent by the payment proxy server, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information.

The memory 1202 is further configured to save the card binding information.

Further, the processor 1201 is further configured to receive a commodity payment request of the user by using a first application, where the first application is an application in the terminal device; determine whether the card binding information stored in the terminal device includes first card binding information according to the terminal device identifier and an application identifier of the first application, where the first card binding information includes the terminal device identifier and the application identifier of the first application; generate a first payment request when the information stored in the terminal device includes the first card binding information; and send the first payment request to the payment proxy server, so that the payment proxy server determines according to the first payment request whether to pay network fees.

Exemplarily, the processor 1201 is specifically configured to acquire the first card binding information; acquire the third user information included in the first card binding information according to the first card binding information; prompt the user to input the payment verification information according to a preset rule and according to the third user information included in the first card binding information; receive the payment verification information that is input by the user; and generate the first payment request, where the first payment request includes the first card binding information and the payment verification information that is input by the user.

In the terminal device provided in this embodiment of the present invention, before online payment is performed, a payment binding relationship is first established, and when the payment binding relationship is established, user information used for online payment is divided into first user information and second user information, and the first user information and the second user information are sent by using a first binding request and a second binding request respectively, so that a third party cannot obtain complete user information; moreover, after the payment binding relationship is established, a user can complete the payment according to the payment binding relationship as long as the user inputs payment verification information, without needing to input the complete user information again, which, compared with the prior art, improves security of user information during the online payment, and can ensure capital security of the user.

Figure 13:
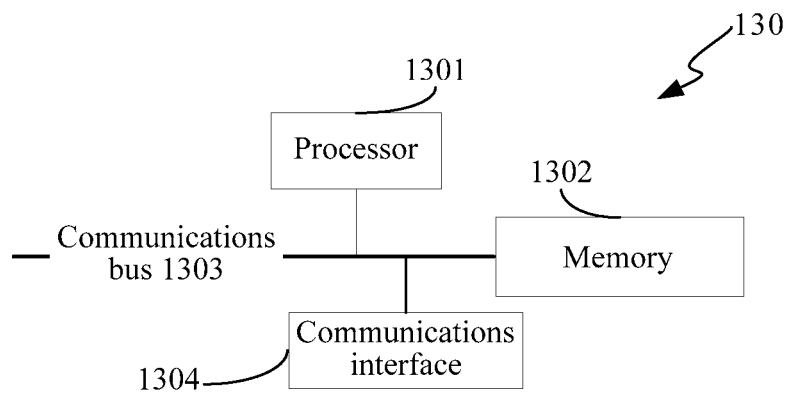
FIG. 13 is a schematic structural diagram of yet another payment proxy server according to an embodiment of the present invention.

An embodiment of the present invention provides a payment proxy server 130. As shown in FIG. 13, the payment proxy server 130 includes: a processor 1301, a memory 1302, a communications bus 1303, and a communications interface 1304.

The communications bus 1303 is configured to implement connection and communication between the processor 1301 and the memory 1302.

The processor 1301 may be a CPU (central processing unit, central processing unit), or an ASIC (Application Specific Integrated Circuit, application-specific integrated circuit), or one or more integrated circuits configured to implement this embodiment of the present invention. The processor 1301 is configured to execute an executable module stored in the memory 1302, such as a computer program.

The memory 1302 may include a RAM (Random Access Memory, high-speed random access memory), or may further include a non-volatile memory (non-volatile memory), such as at least one magnetic disk storage. The memory 1302 is configured to store the executable module, where the executable module may be program code, and the program code includes a computer operation instruction.

The communications interface 1304 may be a wireless interface, or may be a wired interface, and is configured to implement communication and connection between the terminal device and another network element, for example, the processor 1301 receives data or executes a program by using the communications interface 1304.

Exemplarily, the processor 1301 executes a computer execution instruction stored in the memory 1302, and is configured to receive a first binding request sent by a terminal device, where the first binding request includes first user information, an application identifier, and a terminal device identifier; generate an associated identifier according to the first binding request, where the associated identifier is associated with the first user information, the application identifier, and the terminal device identifier; send the associated identifier to the terminal device, so that the terminal device generates a second binding request according to the associated identifier, where the second binding request includes second user information and the associated identifier, and the second user information and the first user information are used for forming complete user information; and then receive the second binding request sent by the terminal device, acquire the complete user information, the application identifier, and the terminal device identifier according to the first binding request and the second binding request, and establish the payment binding relationship according to the complete user information, the application identifier, and the terminal device identifier, where the payment binding relationship is used for indicating a binding relationship among the complete user information, the application identifier, and the terminal device identifier.

Further, the processor 1301 is specifically configured to acquire the second user information and the associated identifier from the second binding request; acquire the first user information, the application identifier, and the terminal device identifier according to the associated identifier; and then combine the first user information and the second user information to form the complete user information.

Further, the processor 1301 is further configured to generate card binding information according to the payment binding relationship, where the card binding information includes the terminal device identifier, the application identifier, and third user information, the third user information is incomplete user information, the terminal device prompts, according to the third user information, a user to input payment verification information when performing online payment, and the third user information and the payment verification information can form the complete user information; and then send the card binding information to the terminal device, so that the terminal device saves the card binding information.

Exemplarily, the processor 1301 is further configured to receive a first payment request sent by the terminal device, where the first payment request includes first card binding information and payment verification information that is input by the user, the first card binding information includes the terminal device identifier, an application identifier of a first application, and the third user information, the first application is an application in the terminal device, and the terminal device receives a commodity payment request of the user by using the first application; acquire the terminal device identifier and the application identifier of the first application according to the first card binding information; acquire, according to the terminal device identifier and the application identifier of the first application, the complete user information bound to the terminal device identifier and the application identifier of the first application; generate local payment verification information according to a preset rule and according to the third user information included in the first card binding information and the complete user information bound to the terminal device identifier and the application identifier of the first application; determine whether the payment verification information that is input by the user is the same as the local payment verification information; and send a second payment request to a payment system when the payment verification information that is input by the user is the same as the local payment verification information, so that the payment system pays network fees.

In the payment proxy server provided in this embodiment of the present invention, before online payment is performed, a payment binding relationship is first established, and when the payment binding relationship is established, a receiver receives first user information and second user information by using a first binding request and a second binding request respectively, so that a third party cannot obtain complete user information; moreover, after the complete user information is obtained, the payment binding relationship is established by using an establishing unit, a user can complete the payment according to the payment binding relationship as long as the user inputs payment verification information, without needing to input the complete user information again, which, compared with the prior art, improves security of user information during the online payment, and can ensure capital security of the user.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An online payment method applied in a terminal device in communication with a payment proxy server, the terminal device comprising a transmitter, receiver and processor in communication with a memory storing computer execution instructions, which instructions when executed by the processor, cause the processor to be configured to cooperate with the transmitter and receiver to provide the online payment method comprising:

generating a first binding request,
    wherein the first binding request comprises first user information, an application identifier, and a terminal device identifier;

sending the first binding request to the payment proxy server to enable the payment proxy server to generate an associated identifier according to the first binding request,
    wherein the associated identifier is associated with the first user information, the application identifier, and the terminal device identifier;

receiving the associated identifier sent by the payment proxy server;

generating a second binding request according to the associated identifier,
    wherein the second binding request comprises second user information and the associated identifier, and the second user information and the first user information are used for forming complete user information; and
sending the second binding request to the payment proxy server to enable the payment proxy server to
    acquire the first user information, the application identifier, and the terminal device identifier according to the first binding request,
    acquire the second user information according to the second binding request,
    acquire the complete user information according to the first user information and the second user information, and
    establish a payment binding relationship among the complete user information, the application identifier, and the terminal device identifier.

2. The method according to claim 1, wherein the generating a second binding request according to the associated identifier comprises:
sending a user information request to the payment proxy server according to the associated identifier, to enable the payment proxy server to send location information of the first user information to the terminal device according to the user information request;
receiving the location information that is of the first user information and is sent by the payment proxy server;
generating the second user information according to the location information of the first user information, wherein the second user information and the first user information are used for forming the complete user information; and
generating the second binding request, wherein the second binding request comprises the second user information and the associated identifier.

3. The method according to claim 1, wherein after the sending the second binding request to the payment proxy server, the method further comprises:
receiving card binding information sent by the payment proxy server,
    wherein the card binding information comprises the terminal device identifier, the application identifier, and third user information, the third user information is incomplete user information, the terminal device prompts, according to the third user information, a user to input payment verification information when performing online payment, and the third user information and the payment verification information can form the complete user information; and
saving the card binding information.

4. The method according to claim 3, wherein after the saving the card binding information, the method further comprises:
receiving a commodity payment request of the user using a first application, wherein the first application is an application in the terminal device;
determining whether the card binding information stored in the terminal device comprises first card binding information according to the terminal device identifier and an application identifier of the first application, wherein the first card binding information comprises the terminal device identifier and the application identifier of the first application;
generating a first payment request when the information stored in the terminal device comprises the first card binding information; and
sending the first payment request to the payment proxy server, to enable the payment proxy server to determine according to the first payment request whether to pay network fees.

5. The method according to claim 4, wherein the generating a first payment request comprises:
acquiring the first card binding information;
acquiring the third user information comprised in the first card binding information according to the first card binding information;
prompting the user to input the payment verification information according to a rule and according to the third user information comprised in the first card binding information;
receiving the payment verification information that is input by the user; and
generating the first payment request, wherein the first payment request comprises the first card binding information and the payment verification information that is input by the user.

6. An online payment method applied in a payment proxy server in communication with a terminal device, the payment proxy server comprising a transmitter, receiver and a processor in communication with a memory storing computer execution instructions, which when executed by the processor, cause the processor to be configured to cooperate with the transmitter and receiver to provide the online payment method comprising:
receiving a first binding request sent by a terminal device, wherein the first binding request comprises first user information, an application identifier, and a terminal device identifier;
generating an associated identifier according to the first binding request, wherein the associated identifier is associated with the first user information, the application identifier, and the terminal device identifier;
sending the associated identifier to the terminal device to enable the terminal device to generate a second binding request according to the associated identifier, wherein the second binding request comprises second user information and the associated identifier, and the second user information and the first user information are used for forming complete user information;
receiving the second binding request sent by the terminal device;
acquiring the complete user information, the application identifier, and the terminal device identifier according to the first binding request and the second binding request; and
establishing a payment binding relationship among the complete user information, the application identifier, and the terminal device identifier.

7. The method according to claim 6, wherein the acquiring the complete user information, the application identifier, and the terminal device identifier according to the first binding request and the second binding request comprises:
acquiring the second user information and the associated identifier from the second binding request;
acquiring the first user information, the application identifier, and the terminal device identifier according to the associated identifier; and
combining the first user information and the second user information to form the complete user information.

8. The method according to claim 6, wherein after the establishing a payment binding relationship according to the complete user information, the application identifier, and the terminal device identifier, the method further comprises:

generating card binding information according to the payment binding relationship, wherein the card binding information comprises the terminal device identifier, the application identifier, and third user information, the third user information is incomplete user information, the terminal device prompts, according to the third user information, a user to input payment verification information when performing online payment, and the third user information and the payment verification information can form the complete user information; and sending the card binding information to the terminal device, to enable the terminal device to save the card binding information.

9. The method according to claim 8, wherein after the sending the card binding information to the terminal device, the method further comprises:

receiving a first payment request sent by the terminal device, wherein the first payment request comprises first card binding information and payment verification information that is input by the user, the first card binding information comprises the terminal device identifier, an application identifier of a first application, and the third user information, the first application is an application in the terminal device, and the terminal device receives a commodity payment request of the user by using the first application;

acquiring the terminal device identifier and the application identifier of the first application according to the first card binding information;

acquiring, according to the terminal device identifier and the application identifier of the first application, complete user information bound to the terminal device identifier and the application identifier of the first application;

generating local payment verification information according to a rule and according to the third user information comprised in the first card binding information and the complete user information bound to the terminal device identifier and the application identifier of the first application;

determining whether the payment verification information that is input by the user is the same as the local payment verification information; and sending a second payment request to a payment system when the payment verification information that is input by the user is the same as the local payment verification information, so that the payment system pays network fees.

10. A terminal device in communication with a payment proxy server, the terminal device comprising a transmitter, a receiver and a processor in communication with a memory storing computer execution instructions, which when executed by the processor, cause the processor to be configured to cooperate with the transmitter and receiver to provide the following operations:

generate a first binding request information, wherein the first binding request comprises first user information, an application identifier, and a terminal device identifier;

send the first binding request to the payment proxy server to enable the payment proxy server to generate an associated identifier according to the first binding request, wherein the associated identifier is associated with the first user information, the application identifier, and the terminal device identifier;

receive the associated identifier sent by the payment proxy server, generate a second binding request according to the associated identifier, wherein the second binding request comprises second user information and the associated identifier, and the second user information and the first user information are used for forming complete user information;

send the second binding request to the payment proxy server to enable the payment proxy server to acquire the first user information, the application identifier, and the terminal device identifier according to the first binding request to acquire the second user information according to the second binding request;

acquire the complete user information according to the first user information and the second user information; and establish a payment binding relationship among the complete user information, the application identifier, and the terminal device identifier.

11. The terminal device according to claim 10, wherein the processor is further configured to cooperate with the transmitter and receiver to provide the following operations:

send a user information request to the payment proxy server according to the associated identifier to enable the payment proxy server to send location information of the first user information to the terminal device according to the user information request;

receive the location information that is of the first user information and is sent by the payment proxy server;

generate the second user information according to the location information of the first user information, wherein the second user information and the first user information are used for forming the complete user information; and generate the second binding request comprising the second user information and the associated identifier.

12. The terminal device according to claim 10, wherein the processor further configured to cooperate with the transmitter and receiver to provide the following operations:

receive card binding information sent by the payment proxy server, wherein the card binding information comprises the terminal device identifier, the application identifier, and third user information, the third user information is incomplete user information, the terminal device prompts, according to the third user information, a user to input payment verification information when performing online payment, and the third user information and the payment verification information can form the complete user information; and save the card binding information.

13. The terminal device according to claim 12, wherein the processor is further configured to cooperate with the transmitter and receiver to provide the following operations:

receive a commodity payment request of the user by using a first application in the terminal device;

determine whether the card binding information stored in the terminal device comprises first card binding information according to the terminal device identifier and an application identifier of the first application, wherein the first card binding information comprises the terminal device identifier and the application identifier of the first application; and generate a first payment request when the information stored in the terminal device comprises the first card binding information; and send the first payment request to the payment proxy server to enable the payment proxy server to determine according to the first payment request whether to pay network fees.

14. The terminal device according to claim 13, wherein the processor is further configured to cooperate with the transmitter and receiver to provide the following operations:

acquire the first card binding information;

acquire the third user information comprised in the first card binding information according to the first card binding information;

prompt the user to input the payment verification information according to a rule and according to the third user information comprised in the first card binding information;

receive the payment verification information that is input by the user; and generate the first payment request, wherein the first payment request comprises the first card binding information and the payment verification information that is input by the user.

15. A payment proxy server in communication with a terminal device, the payment proxy server comprising a transmitter, a receiver and a processor in communication with a memory storing computer execution instructions, which when executed by the processor, cause the processor to be configured to cooperate with the transmitter and receiver to provide the following operations:

receive a first binding request sent by the terminal device, wherein the first binding request comprises first user information, an application identifier, and a terminal device identifier;

generate an associated identifier according to the first binding request, wherein the associated identifier is associated with the first user information, the application identifier, and the terminal device identifier;

send the associated identifier to the terminal device in order to enable the terminal device to generate a second binding request according to the associated identifier, wherein the second binding request comprises second user information and the associated identifier and the second user information and the first user information are used for forming complete user information;

receive the second binding request sent by the terminal device;

acquire the complete user information, the application identifier, and the terminal device identifier according to the first and second binding requests; and establish a payment binding relationship according to the complete user information, the application identifier, and the terminal device identifier, wherein the payment binding relationship is used for indicating a binding relationship among the complete user information, the application identifier, and the terminal device identifier.

16. The payment proxy server according to claim 15, wherein the processor is further configured to cooperate with the transmitter and receiver to provide the following operations:

acquire the second user information and the associated identifier from the second binding request;

acquire the first user information, the application identifier, and the terminal device identifier according to the associated identifier; and combine the first user information and the second user information to form the complete user information.

17. The payment proxy server according to claim 15, wherein the processor is further configured to cooperate with the transmitter and receiver to provide the following operations:

generate card binding information according to the payment binding relationship,
wherein the card binding information comprises the terminal device identifier, the application identifier, and third user information, the third user information is incomplete user information, the terminal device prompts, according to the third user information, a user to input payment verification information when performing online payment, and the third user information and the payment verification information can form the complete user information, wherein send the card binding information to the terminal device, to enable the terminal device to save the card binding information.

18. The payment proxy server according to claim 17, wherein the processor is further configured to cooperate with the transmitter and receiver to provide the following operations:

receive a first payment request sent by the terminal device,
wherein the first payment request comprises first card binding information and payment verification information that is input by the user, the first card binding information comprises the terminal device identifier, an application identifier of a first application, and the third user information, the first application is an application in the terminal device, and the terminal device receives a commodity payment request of the user by using the first application;

acquire the terminal device identifier and the application identifier of the first application according to the first card binding information;

acquire, according to the terminal device identifier and the application identifier of the first application, the complete user information bound to the terminal device identifier and the application identifier of the first application;

generate local payment verification information according to a rule and according to the third user information comprised in the first card binding information and the complete user information bound to the terminal device identifier and the application identifier of the first application;

determine whether the payment verification information that is input by the user is the same as the local payment verification information; and send a second payment request to a payment system when the payment verification information that is input by the user is the same as the local payment verification information, so that the payment system pays network fees.

19. An online payment system comprising a terminal device and a payment proxy server, wherein the terminal device in communication with the payment proxy server and comprising a first transmitter, a first receiver and a first processor and a first memory storing computer execution instructions, which when executed by the first processor, cause the first processor to be configured to cooperate with the first transmitter and first receiver to send a first binding request to the payment proxy server; and send a second binding request to the payment proxy server according to an associated identifier sent by the payment proxy server to enable the payment proxy server to acquire complete user information comprising user information, the application identifier, and the terminal device identifier according to the first binding request and the second binding request, and establish a payment binding relationship according to the complete user information;

receive a commodity payment request of a user by using a first application; and send a first payment request to the payment proxy server when card binding information stored in the terminal device comprises first card binding information to enable the payment proxy server to determine according to the first payment request whether to pay network fees, wherein the first card binding information comprises the terminal device identifier and an application identifier of the first application; and the payment proxy server in communication with the terminal device and comprising a second transmitter, a second receiver and a second processor in communication with a second memory storing computer execution instructions, which when executed by the second processor, cause the second processor to be configured to cooperate with the second transmitter and second receiver to receive the first binding request of the terminal device;

generate the associated identifier according to the first binding request;

send the associated identifier to the terminal device to enable the terminal device to generate the second binding request according to the associated identifier;

receive the second binding request generated by the terminal device;

acquire the complete user information, the application identifier, and the terminal device identifier according to the first binding request and the second binding request;

establish the payment binding relationship according to the complete user information, the application identifier, and the terminal device identifier;

receive the first payment request of the terminal device;

generate local payment verification information according to the first payment request; and send a second payment request to a payment system when payment verification information that is input by the user and comprised in the first payment request is the same as the local payment verification information, to enable the payment system to pay network fees.

20. The online payment system of claim 19, wherein the first processor is further configured to cooperate with the first transmitter and first receiver to provide the following operations:

send a user information request to the payment proxy server according to the associated identifier to enable the payment proxy server to send location information of the first user information to the terminal device according to the user information request;

receive the location information that is of the first user information and is sent by the payment proxy server;

generate the second user information according to the location information of the first user information, wherein the second user information and the first user information are used for forming the complete user information; and generate the second binding request comprising the second user information and the associated identifier.

21. The online payment system of claim 19, wherein the second processor is further configured to cooperate with the second transmitter and second receiver to provide the following operations:

acquire the second user information and the associated identifier from the second binding request;

acquire the first user information, the application identifier, and the terminal device identifier according to the associated identifier; and combine the first user information and the second user information to form the complete user information.

* * * * *